United States Patent
Zhang et al.

(10) Patent No.: US 9,755,963 B2
(45) Date of Patent: Sep. 5, 2017

(54) USING HEADERSPACE ANALYSIS TO IDENTIFY FLOW ENTRY REACHABILITY

(71) Applicant: Nicira, Inc., Palo Alto, CA (US)

(72) Inventors: Ronghua Zhang, San Jose, CA (US); Amre Shakimov, Cupertino, CA (US); Teemu Koponen, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 243 days.

(21) Appl. No.: 14/325,228

(22) Filed: Jul. 7, 2014

(65) Prior Publication Data

US 2015/0016460 A1    Jan. 15, 2015

Related U.S. Application Data

(60) Provisional application No. 61/844,331, filed on Jul. 9, 2013.

(51) Int. Cl.
*H04L 12/721* (2013.01)
*H04L 12/931* (2013.01)
(Continued)

(52) U.S. Cl.
CPC .............. *H04L 45/38* (2013.01); *H04L 45/08* (2013.01); *H04L 45/586* (2013.01);
(Continued)

(58) Field of Classification Search
None
See application file for complete search history.

(56) References Cited

U.S. PATENT DOCUMENTS 6,118,760 A * 9/2000 Zaumen ............ G06F 17/30982
370/229
6,834,139 B1    12/2004 Prairie et al.
(Continued)

FOREIGN PATENT DOCUMENTS

WO    WO 2012/093429    7/2012
WO    WO 2012/126488    9/2012
(Continued)

OTHER PUBLICATIONS

International Search Report and Written Opinion of PCT/US2014/045800, Nov. 19, 2014 (mailing date), Nicira, Inc.
(Continued)

*Primary Examiner* — Tejis Daya
(74) *Attorney, Agent, or Firm* — Adeli LLP

(57) ABSTRACT

Some embodiments provide a method for using headerspace analysis. The method receives several flow entries for distribution to a forwarding element in a network. Each flow entry includes a set of conditions to be matched by a packet header and a set of actions to perform on a packet that matches the set of conditions. The method models each of the flow entries as a function that operates on a representation of a packet header. The method determines a set of packet headers of packets to be received by the forwarding element. The method determines a set of the flow entries that are not matched by a packet header of any packet to be received by the forwarding element by applying the functions to representations of the identified set of packet headers.

23 Claims, 21 Drawing Sheets

(51) Int. Cl.
*H04L 12/751* (2013.01)
*H04L 12/741* (2013.01)
*H04L 12/713* (2013.01)
*H04L 12/851* (2013.01)

(52) U.S. Cl.
CPC ........ *H04L 45/745* (2013.01); *H04L 47/2441* (2013.01); *H04L 49/70* (2013.01)

(56) References Cited

U.S. PATENT DOCUMENTS

| | | | |
|---|---|---|---|
| 7,079,544 B2 | 7/2006 | Wakayama et al. | |
| 7,194,661 B1 | 3/2007 | Payson | |
| 7,349,382 B2 | 3/2008 | Marimuthu et al. | |
| 8,693,344 B1 | 4/2014 | Adams et al. | |
| 8,942,085 B1* | 1/2015 | Pani | H04L 45/02 370/225 |
| 8,964,569 B2* | 2/2015 | Jocha | 370/241.1 |
| 8,971,338 B2* | 3/2015 | Mishra | H04L 49/00 370/401 |
| 9,042,234 B1* | 5/2015 | Liljenstolpe | H04L 45/00 370/238 |
| 9,071,529 B2* | 6/2015 | Garg | |
| 2004/0037276 A1 | 2/2004 | Henderson et al. | |
| 2005/0053079 A1 | 3/2005 | Havala | |
| 2005/0135351 A1* | 6/2005 | Parmar | H04L 45/742 370/389 |
| 2006/0029056 A1 | 2/2006 | Perera et al. | |
| 2006/0182037 A1 | 8/2006 | Chen et al. | |
| 2006/0206655 A1 | 9/2006 | Chappell et al. | |
| 2011/0320632 A1* | 12/2011 | Karino | H04L 45/586 709/238 |
| 2012/0155467 A1* | 6/2012 | Appenzeller | H04L 45/54 370/392 |
| 2012/0303835 A1* | 11/2012 | Kempf | H04W 24/02 709/235 |
| 2013/0128746 A1* | 5/2013 | Yedavalli | H04L 45/38 370/238 |
| 2013/0163602 A1* | 6/2013 | Kang | H04L 12/56 370/400 |
| 2013/0176850 A1 | 7/2013 | Mishra et al. | |
| 2013/0246655 A1* | 9/2013 | Itoh | H04L 12/56 709/238 |
| 2014/0133305 A1 | 5/2014 | Brolin et al. | |
| 2014/0146674 A1 | 5/2014 | Wang et al. | |
| 2014/0241356 A1* | 8/2014 | Zhang | H04L 45/38 370/392 |
| 2015/0009830 A1 | 1/2015 | Bisht et al. | |
| 2015/0016279 A1 | 1/2015 | Zhang et al. | |
| 2015/0043585 A1 | 2/2015 | Iihoshi et al. | |
| 2015/0117454 A1 | 4/2015 | Koponen et al. | |
| 2015/0222446 A1* | 8/2015 | Suresh | H04L 12/185 370/390 |

FOREIGN PATENT DOCUMENTS

| | | |
|---|---|---|
| WO | PCT/US2014/045800 | 7/2014 |
| WO | WO 2015/006354 | 1/2015 |

OTHER PUBLICATIONS

Gupta, Pankaj, et al., "Packet Classification on Multiple Fields," In Proc. of SIGCOMM, Month Unknown, 1991, 14 pages, Stanford, California, USA.
Krishnaswamy, Umesh, et al., "ONOS Open Network Operating System—An Experimental Open-Source Distributed SDN OS," Apr. 16, 2013, 24 pages.
Pankaj, Berde, et al., "ONOS Open Network Operating System an Open-Source Distributed SDN OS," Dec. 19, 2013, 34 pages.
Singh, Sumeet, et al., "Packet Classification Using Mutidimensional Cutting," SIGCOMM '03, Aug. 25-19, 2003, 12 pages, Karlsruhe, Germany.
Xie, Geoffrey G., et al., "On Static Reachability Analysis of IP Networks," Month Unknown, 2005, pp. 1-14.
Invitation to Pay Additional Fees with Partial Search Report for PCT/US2014/045800, Sep. 25, 2014 (mailing date), Nicira, Inc.
Pfaff, Ben, et al., "OpenFlow Switch Specification," Sep. 6, 2012, pp. 1-128, The Open Networking Foundation.
Portions of prosecution history of U.S. Appl. No. 14/325,230, May 25, 2016, Zhang, Ronghua, et al.

\* cited by examiner

USING HEADERSPACE ANALYSIS TO IDENTIFY FLOW ENTRY REACHABILITY

CLAIM OF BENEFIT TO PRIOR APPLICATION

This application claims the benefit of U.S. Provisional Application 61/844,331, filed Jul. 9, 2013. U.S. Application 61/844,331 is incorporated herein by reference.

BACKGROUND

Today, in certain virtualized network environments, network controllers generate a large number of flow entries to manage the behavior of forwarding elements, and distribute these flow entries to the forwarding elements. The forwarding elements (e.g., software forwarding elements such as virtual switches) manage the sending of packets between various physical and virtual entities based on these flow entries, which are rules that the forwarding elements apply to send the packets. A single forwarding element may apply several flow entries to a packet before sending the packet to its next destination.

It is difficult to determine whether every single one of the flow entries is necessary or which flow entries are necessary for which forwarding elements. It is also difficult to determine which features (e.g., ACL, port security, etc.) depend on a particular flow entry. In determining whether flow entries are necessary, solutions producing false positives (identifying flow entries as necessary even though they are not) are still useful, but solutions producing false negatives (identifying flow entries as unnecessary, even though they are necessary) can result in the elimination of needed flow entries and thereby cause problems in the system. A random packet injection approach, where random packets are injected into the system (e.g., using a simulator) to observe the set of flow entries that are employed, is an example of a solution with false negative results.

BRIEF SUMMARY

Some embodiments provide novel techniques for analyzing the flow entries for distribution to one or more managed forwarding elements in a system. Some embodiments represent packet headers and corresponding metadata (referred to generally as "packet headers") as a set of fields, and model the flow entries as transfer functions on the fields representing packet headers. Using these techniques, some embodiments determine flow entries that will not be used in a managed forwarding element. In addition, or alternatively, some embodiments use the analysis to identify classes of packets to use for testing an implementation of the system.

To perform flow reachability analysis (i.e., determining which flow entries will be used and which flow entries will not be used), some embodiments model each of the flow entries for a particular managed forwarding element as transfer functions, then perform an analysis of all of the packets that could be received by the managed forwarding element. In some embodiments, this analysis is performed recursively, as packet headers with some of the fields wildcarded could match numerous flow entries at a particular stage, depending on how a specific field is un-wildcarded (i.e., resolved to a particular value). Some embodiments begin with a fully wildcarded packet header, while other embodiments set some fields of the packet header (e.g., the input port). After inputting the full set of packet headers and identifying the sets of possible flow entries matched by the sets of possible packets, some embodiments remove from the system the flow entries that will never be matched, thereby saving memory on the managed forwarding elements.

In general, packets will be processed by more than one managed forwarding element in a network. In some embodiments, the packets are output from one managed forwarding element via a tunnel (e.g., an encapsulation technique) to a second managed forwarding element, which then also processes the packet using its own flow entries. Thus, in some embodiments, the flow reachability analysis accounts for packets that arrive via tunnels as well as packets sent from machines (e.g., virtual machines) directly connected to the managed forwarding elements. To perform the analysis for packets arriving from tunnels, some embodiments initially perform the flow analysis for packets sent from locally-connected machines to each of the managed forwarding elements in the network, storing the headers for packets output to tunnels. Then, the packets tunneled to each MFE are input into the flow analysis, in order to identify additional flow entries that will be used to process these packets.

In addition to accounting for packets received through tunnels, some embodiments also account for learning actions. Some flow entries have learning actions that create new flow entries at a managed forwarding element. For example, when a managed forwarding element receives a packet for an unknown destination, the forwarding element may perform a type of L2 learning. In some embodiments, the managed forwarding element sends the packet to a service node, which is a specific type of managed forwarding element that handles broadcast, unknown, and multicast (BUM) packets, possibly among other features. The service node, in addition to forwarding the packet to its destination, returns information to the managed forwarding element, allowing the forwarding element to create a new flow entry or set of flow entries such that future packets sent to the particular destination can be forwarded directly to their destination.

The creation of new flow entries through such learning actions may cause future packets to be processed by flow entries the use of which would not be detected on a first pass of the flow reachability analysis. Accordingly, some embodiments perform a first iteration of the flow reachability analysis to determine the flow entries that would be created by the learning actions, then perform a second iteration of the analysis with these new flow entries, to determine all of the flow entries that could be used in the network. Only the flow entries not used in either iteration will be removed from usage in the network.

In addition to the flow reachability analysis, after performing analysis of the possible input packets, some embodiments identify paths (i.e., sequences of matched flow entries, in one or more managed forwarding elements) between a particular source and particular destination. By using the inverses of the transfer functions representing the flow entries in a path, a class of packets can be identified (e.g., with certain fields defined as wildcards). In order to test the flow entries in an implementation of the system, only one packet per packet class need be injected into the system, rather than numerous packets that follow redundant paths.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Some embodiments provide novel techniques for analyzing the flow entries for distribution to one or more managed forwarding elements in a system. Some embodiments represent packet headers and corresponding metadata (referred to generally as "packet headers") as a set of fields, and model the flow entries as transfer functions on the fields representing packet headers. Using these techniques, some embodiments determine flow entries that will not be used in a managed forwarding element. In addition, or alternatively, some embodiments use the analysis to identify classes of packets to use for testing an implementation of the system.

To perform these operations, some embodiments use headerspace analysis, which analyzes the bits or fields of an entire packet header in order to analyze the networks (e.g., production networks) through which the packets will be sent. Some embodiments of the invention provide a network controller that uses headerspace analysis to analyze the flow entries generated by the network controller for a particular logical network. Specifically, the network controller uses headerspace analysis to detect unnecessary flow entries (sometimes referred to as "dead" flow entries) without producing false negative results (i.e., without classifying flow entries as unnecessary when certain packets sent in the network could match those flow entries). The network controller analyzes the flow entries for one or more forwarding elements and does not distribute to the forwarding elements any flow entries that are determined unnecessary on the forwarding element.

This specification often refers to packets and packet headers. The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

As mentioned, some embodiments analyze the flow entries generated by a network controller (or cluster of network controllers that form a network control system) for a logical network. In some embodiments, the network control system actually generates flow entries for numerous logical networks to be implemented in a physical managed network (e.g., a private datacenter such as an enterprise site, a public datacenter, etc.).

Figure 1:
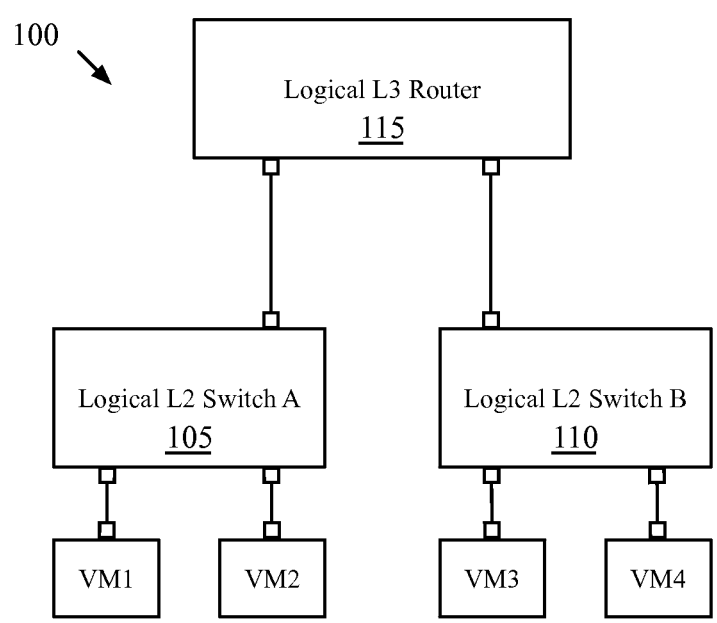
FIG. 1 conceptually illustrates an example logical network architecture of some embodiments.

FIG. 1 conceptually illustrates an example logical network architecture 100 of some embodiments. The logical network 100 includes two logical switches 105 and 110 and a logical router 115. Each of the logical switches 105 and 110 connects several virtual machines (in this case, two virtual machines (VMs) are connected by each logical switch, though many networks will have far more VMs attached to each logical switch), and the logical router 115 connects the two logical switches (i.e., logical layer 2 domains) together. In addition, in some embodiments the logical router 115 connects the logical network to an external network.

In some embodiments, the logical network is an abstract conception of a network generated by an administrator, which is implemented in a virtualized, distributed manner in a managed physical infrastructure (e.g., a datacenter). That is, the virtual machines that connect to the logical switches may reside on various different host machines within the infrastructure, and physical managed forwarding elements (e.g., software virtual switches) operating on these host machines implement some or all of the logical forwarding elements (logical switches, logical routers, etc.).

Figure 2:
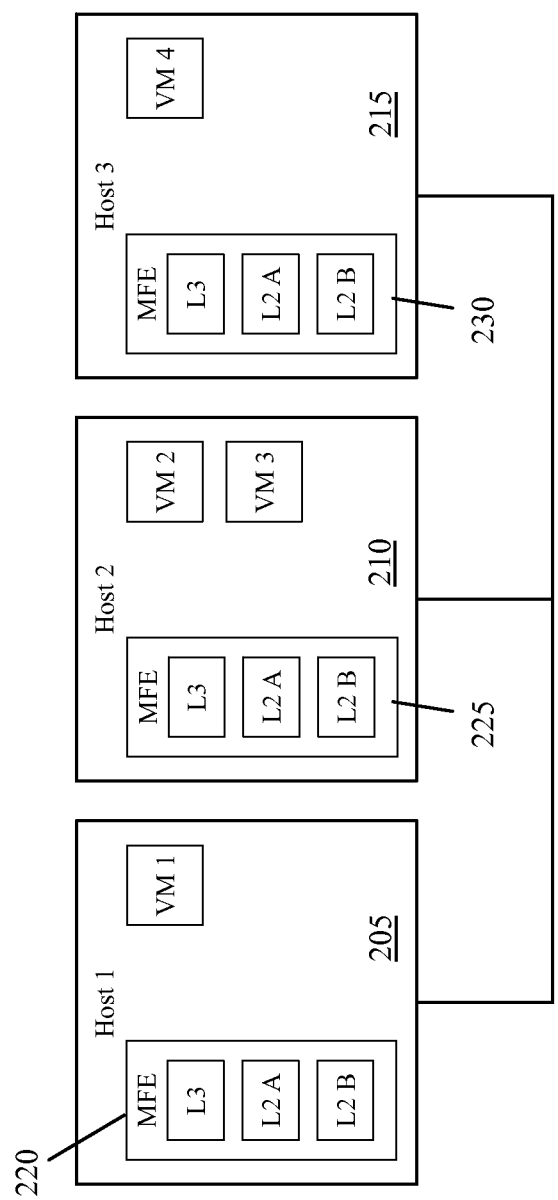
FIG. 2 conceptually illustrates a physical implementation of the logical network of FIG. 1.

FIG. 2 conceptually illustrates a physical implementation of the logical network 100. While both the logical switches 105 and 110 and the logical router 115 are implemented in a distributed manner in this example, some embodiments implement the logical router in a centralized manner (e.g., using separate host machines to implement the router). As shown, the physical infrastructure of the managed network 200 includes three host machines 205-215 for hosting virtual machines. The VMs of the logical network 100 reside on the hosts 205-215, implemented on top of virtualization software (e.g., a hypervisor, virtual machine monitor, etc.) that operates in the host. One of ordinary skill in the art will recognize that the physical infrastructure of some embodiments will generally include numerous hosts with many virtual machines, from numerous logical networks.

In addition to the virtual machines, each of the hosts 205-215 operates a managed forwarding element (MFE) 220-230. In some embodiments, this MFE is a software virtual switch that operates within the virtualization software of the host (e.g., Open vSwitch, or another software forwarding element). In the implementation illustrated in FIG. 2, the MFEs 220-230 implement the logical switches 105 and 110, as well as the logical router 115. As shown, even when only one VM attached one of the logical switches resides on a particular host (e.g., the host 205), the MFE on that host implements both of the logical switches in addition to the logical router. This enables first-hop logical processing in some embodiments, in which most or all of the logical processing for a packet is performed at the first MFE that receives the packet. Thus, a packet sent from VM 1 to VM 4 would be processed, at the MFE 220, through logical switch 105 to logical router 115 and then to logical switch 110. The MFE would identify the logical egress port of the logical switch 110 for the packet as the port to which VM 4 attaches, and map this egress port to a tunnel to the MFE 230 at the host 215. The MFE 230 would then perform additional processing (e.g., egress ACL or other processing), and deliver the packet to VM 4. In both MFEs 220 and 230, the processing is performed by matching the packet to flow entries along a series of stages in some embodiments.

Figure 3:
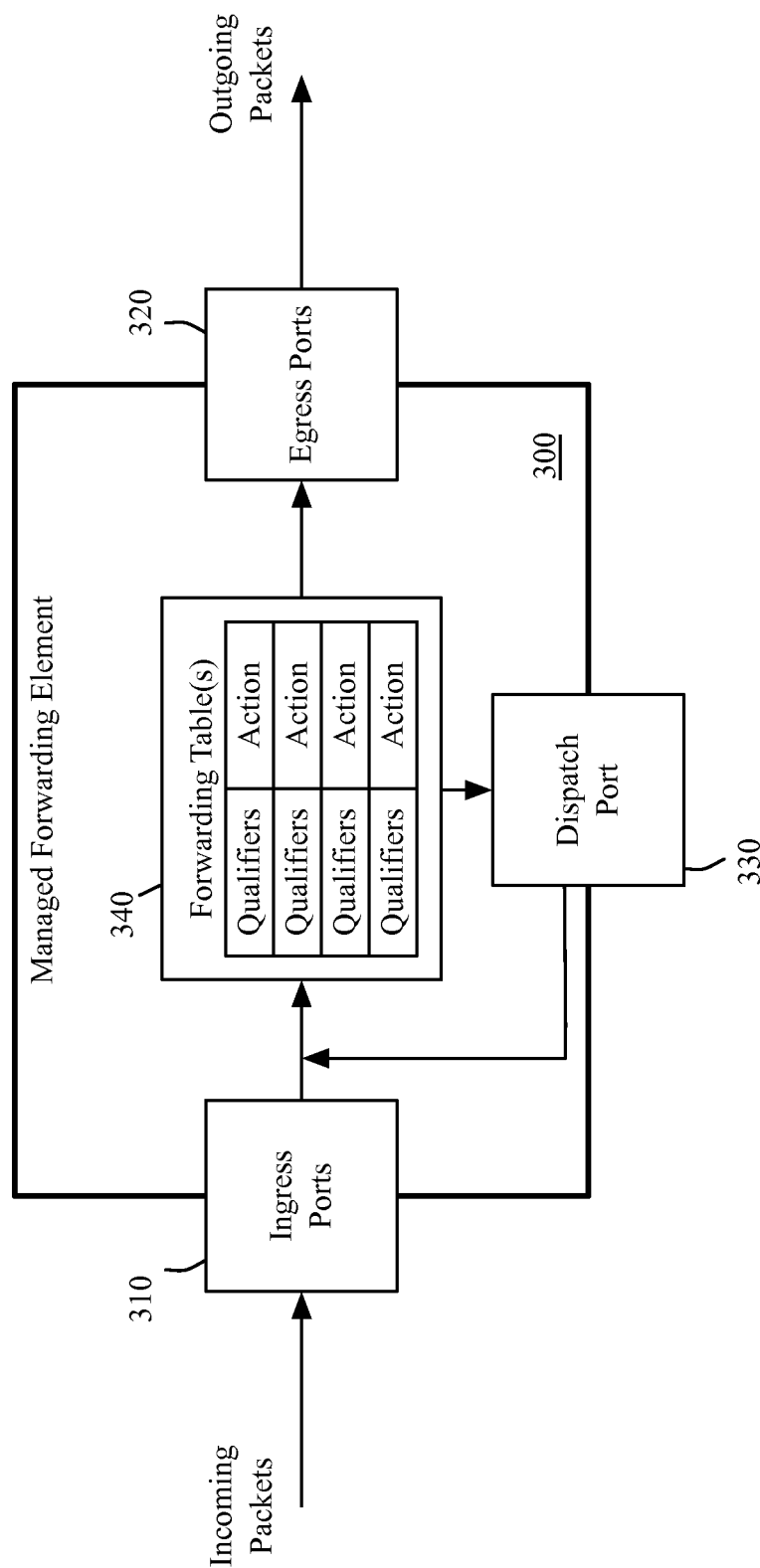
FIG. 3 conceptually illustrates a diagram of a managed forwarding element of some embodiments.

FIG. 3 conceptually illustrates a diagram of a managed forwarding element 300 of some embodiments. As shown, the MFE 300 includes a set of ingress ports 310, a set of egress ports 320, a dispatch port 330, and a set of forwarding tables 340. The MFE 300 receives packets through the ingress ports 310, processes the packets through the forwarding tables 340, and eventually sends the packets out via the egress ports 320. In some embodiments, the ingress ports 310 and egress ports 320 are actually the same set of ports, with each packet received at one of the ports and sent out through one of the ports. The ingress and egress ports 310 and 320 may be ports through which VMs connect to the MFE 300, or tunnel ports through which the MFE 300 connects to other MFEs.

The forwarding tables 340 contain numerous flow entries. As shown, each flow entry is made up of a set of qualifiers (also referred to as a flow expression) and a set of actions. A flow expression contains a set of match conditions, which filter packets based on the packet headers and/or metadata (e.g., register values stored for the packets by the MFE 300). When a packet meets the match conditions for a particular flow entry, the MFE 300 applies the set of actions specified by the flow entry (in an order specified by the flow entry, in some embodiments) to the packet. One of these actions, in some embodiments, is a resubmit action, that sends the packet to the dispatch port 330, and then back to the forwarding tables to match a different flow entry.

As mentioned above, the managed forwarding elements (such as MFE 300) do not necessarily need all of the flow entries generated for the logical network, and therefore some embodiments perform analysis to identify which flow entries need not be sent to the MFE. In order to perform this flow reachability analysis (i.e., determining which flow entries will be used and which flow entries will not be used), some embodiments model each of the flow entries for a particular MFE as transfer functions, then perform an analysis of all of the packets that could be received by the MFE. In some embodiments, this analysis is performed recursively, as packet headers with some of the fields wildcarded could match numerous flow entries at a particular stage, depending on how a specific field is un-wildcarded (i.e., resolved to a particular value). Some embodiments begin with a fully wildcarded packet header, while other embodiments set some fields of the packet header (e.g., the input port). After inputting the full set of packet headers and identifying the sets of possible flow entries matched by the sets of possible packets, some embodiments remove from the system the flow entries that will never be matched, thereby saving memory on the MFEs.

As discussed above, in some embodiments the packets are output from one MFE via a tunnel (e.g., an encapsulation technique) to a second MFE, which then also processes the packet using its own flow entries. Thus, in some embodiments, the flow reachability analysis accounts for packets that arrive via tunnels as well as packets sent from machines (e.g., virtual machines) directly connected to the MFEs. To perform the analysis for packets arriving from tunnels, some embodiments initially perform the flow analysis for packets sent from locally-connected machines to each of the MFEs in the network, storing the headers for packets output to tunnels. Then, the packets tunneled to each MFE are input into the flow analysis, in order to identify additional flow entries that will be used to process these packets.

In addition to accounting for packets received through tunnels, some embodiments also account for learning actions. Some flow entries have learning actions that create new flow entries at a MFE. For example, when a MFE receives a packet for an unknown destination, the MFE may perform a type of L2 learning. In some embodiments, the MFE sends the packet to a service node, which is a specific type of MFE that handles broadcast, unknown, and multicast (BUM) packets, possibly among other features. The service node, in addition to forwarding the packet to its destination, returns information to the MFE, allowing the MFE to create a new flow entry or set of flow entries such that future packets sent to the particular destination can be forwarded directly to their destination.

The creation of new flow entries through such learning actions may cause future packets to be processed by flow entries the use of which would not be detected on a first pass of the flow reachability analysis. Accordingly, some embodiments perform a first iteration of the flow reachability analysis to determine the flow entries that would be created by the learning actions, then perform a second iteration of the analysis with these new flow entries, to determine all of the flow entries that could be used in the network. Only the flow entries not used in either iteration will be removed from usage in the network.

In addition to the flow reachability analysis, after performing analysis of the possible input packets, some embodiments identify paths (i.e., sequences of matched flow entries, in one or more managed forwarding elements)

between a particular source and particular destination. By using the inverses of the transfer functions representing the flow entries in a path, a class of packets can be identified (e.g., with certain fields defined as wildcards). In order to test the flow entries in an implementation of the system, only one packet per packet class need be injected into the system, rather than numerous packets that follow redundant paths. The flow entries can be used to test the flow entry correctness in some embodiments.

The headerspace analysis can be used for other applications to analyze a logical network and its implementation in some embodiments. For instance, the path analysis described for generating test packet classes can also be put to other uses. Some embodiments use headerspace analysis to identify a set of flow entries that eventually cause a packet to be processed by a particular flow entry. That is, the analysis of the paths can determine all of the different flow entries that are matched by packets which eventually match a particular flow entry (i.e., similar to the scope cod analysis tool that identifies functions that can result in a call to a particular function), as well as identifying all of the different flow entries matched by packets after matching the particular flow entry.

In addition, some embodiments provide an application that annotates flow entries with features that generate the flow entry. The analytic application of some of these embodiments uses the annotated features to calculate the minimum number of flow entries required by each feature.

Furthermore, Access Control Lists (ACLs) and other user settings are often not readily understood by the users, particularly when there are a large number of different rules with different priorities. Some embodiments of the invention use headerspace analysis to determine the final outcome of a user configuration and summarize the results in a human understandable form for the users. That is, some embodiments perform the flow reachability and/or path analysis, then summarize for the user (e.g., the network administrator) how the rules interact with each other based on this analysis.

The above description introduces the use of headerspace analysis to analyze flow entries generated to implement a logical network. Several more detailed embodiments are described below. First, Section I describes headerspace analysis in further detail. Section II then describes flow reachability analysis of some embodiments, while Section III describes applications that generate test packets for testing sets of flow entries between two network locations. Finally, Section IV describes an electronic system with which some embodiments of the invention are implemented.

I. Headerspace Analysis

Before describing the applications to analysis of the flow entries implementing a logical network, the details of headerspace analysis (HSA) will introduced. In some embodiments, a network controller, or network analysis tool analyzing the output of a network controller, performs HSA on the flow entries generated by a network controller. HSA, in some embodiments, analyzes a range of bits or a set of fields (e.g., a headerspace) in a packet. The following description will describe the analysis in terms of bitwise analysis; however, in some embodiments the analysis analyzes the values of packet header and metadata fields, rather than individual bits.

In some embodiments, the bit range for analysis includes the first L bits of a packet that make up the packet header and M bits of metadata (e.g., register values, etc.) stored for the packet while it is processed by an MFE. The analysis application defines a region in a $\{0, 1\}^{L+M}$ space. In the discussion below, this space is called a Flow Space (FS), and a defined region in the space is called a Flow Region (FR). The flow space is an n-dimensional binary space, where n is the number of bits in the range of bits (L+M). For visualization purposes, a $\{0, 1\}^3$ flow space representing a three bit headerspace will be used within this Section. The 3D flow space has values of 0 and 1 along each axis. The x-axis represents the first bit of the headerspace, the y-axis represents the second bit, and the z-axis represents the third bit. This space effectively has eight possible values, as values between 0 and 1 are not allowed; however, the examples will show lines and planes in this space in order to illustrate wildcarded bits.

A flow region of the flow space is defined by the range of bits (e.g., headerspace) in a packet in some embodiments. In this example, a single point in the 3D space represents a particular combination of the three bits. For example, a bit combination of "100" would be represented in the flow space by a point at the coordinates (1,0,0).

Figure 4:
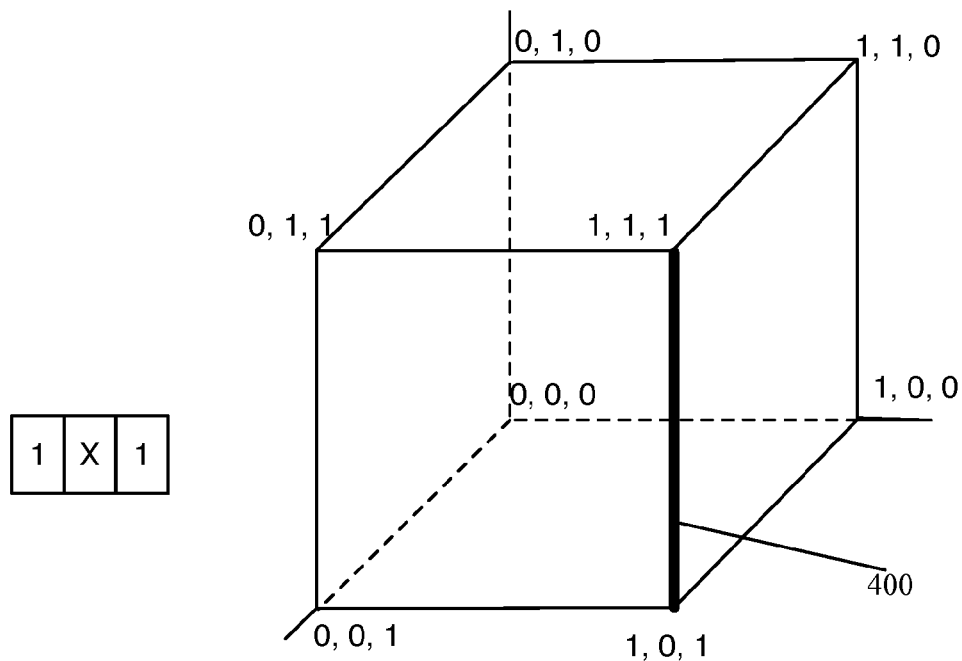
FIGS. 4 and 5 provide illustrative examples of flow regions in a 3-dimensional flow space.
Figure 5:
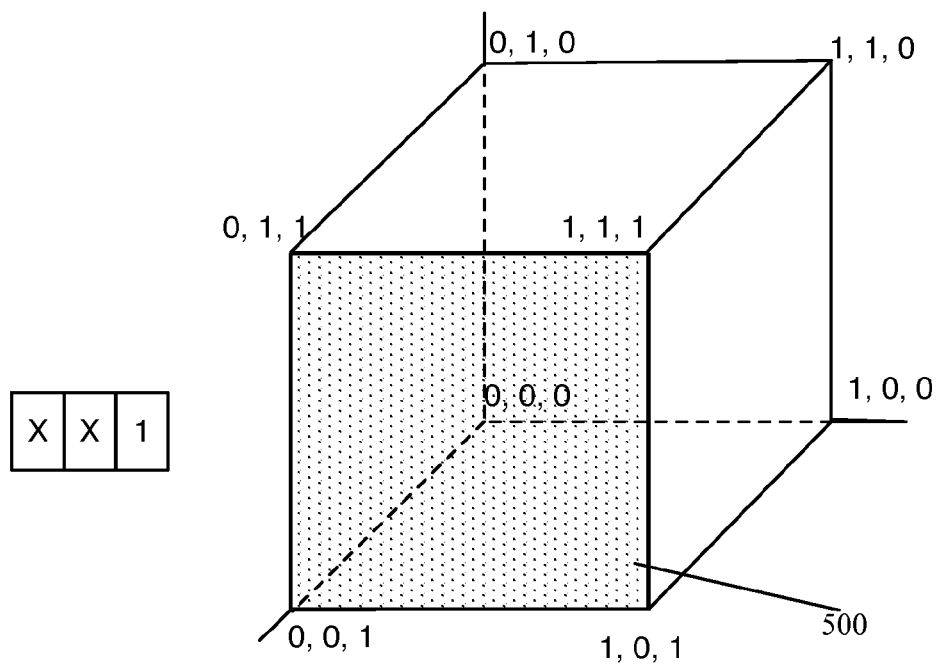

A region of the flow space is defined with the use of wildcards. FIGS. 4 and 5 provide illustrative examples of flow regions in a 3-dimensional flow space. Specifically, FIG. 4 illustrates that a bit combination of "1*1" is represented in the flow space by a line 400 (shown as bold) between the coordinates (1,0,1) and (1,1,1), where the wildcard (*) can be matched with either a 0 or a 1. FIG. 5 illustrates that a bit combination of "**1" is represented in the flow space by a plane 500 (shown as dotted) between the coordinates (0,1,1), (1,1,1), (1,0,1), and (0,0,1). In this case, both of the first two bits can be matched with either a 0 or a 1.

A flow region need not be a single contiguous region in some embodiments. For example, a flow region may be defined to include two separate regions, such as the set of bit combinations "**1" and "11*", represented by both the plane between (0,1,1), (1,1,1), (1,0,1), and (0,0,1) and the line between (1,1,0) and (1,1,1).

As described in further detail below, some embodiments of the invention use headerspace analysis to model the flow entries generated by a network controller. In some embodiments, a modeling application or module models each flow entry as a transfer function and, in some cases, generates a corresponding inverse transfer function.

Figure 6:
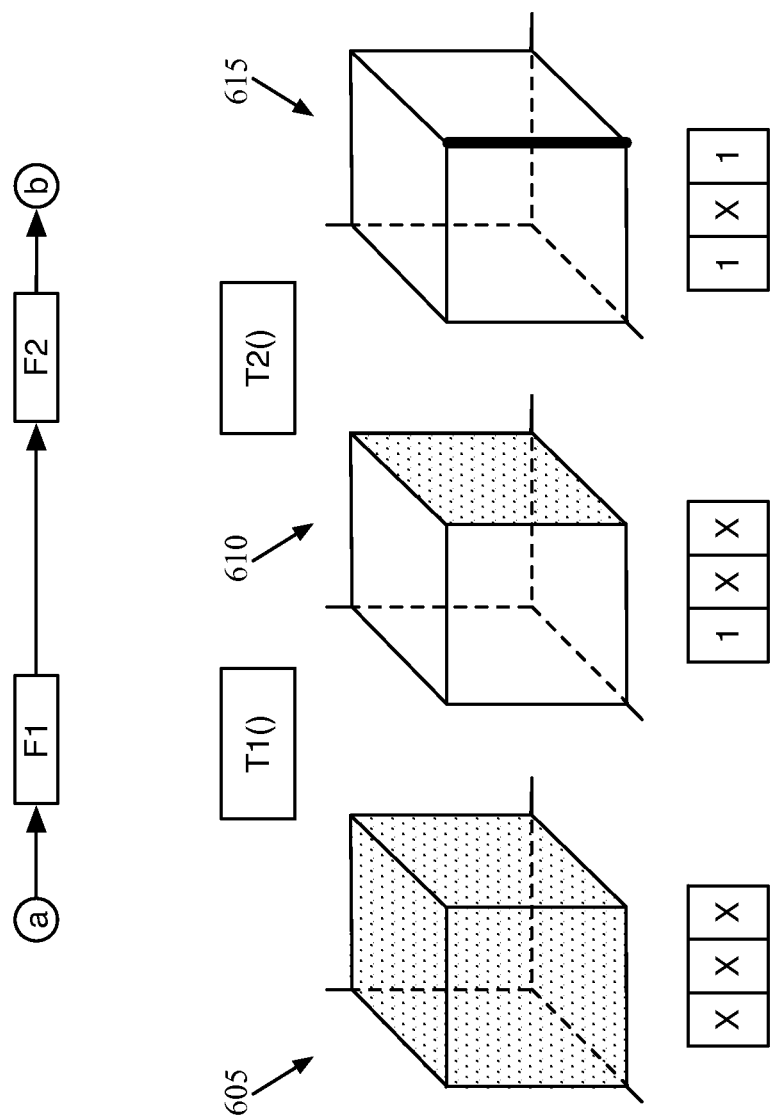
FIG. 6 illustrates an example of two transfer functions operating on flow regions between two network locations.

FIG. 6 illustrates an example of two transfer functions operating on flow regions between two network locations a and b. The network locations a and b may represent logical ports of a logical switch, physical ports of a managed forwarding element, or even intermediate stages of a packet as the packet is processed through one or more MFEs that implement a logical network. As shown in this figure, the packet matches two flow entries F1 and F2 between network location a and network location b.

These two flow entries are modeled as transfer functions T1( ) and T2( ), each of which maps a flow region in a 3-bit flow space into a new flow region in that space. Based on the effects of a particular flow entry (e.g., the match conditions and corresponding actions), each transfer function receives as input a first region of a flow space and outputs a new region of the flow space. For example, a flow entry may write a value to a register, overwrite a section of a header (e.g., when performing MAC address replacement during IP routing), add a new field to the header, etc. Based on the effect of the flow entry on the headerspace, the modeling application calculates a function to describe the flow entry as a conversion of one flow region into another.

The effects of the transfer functions T1( ) and T2( ) are shown in the three flow regions 605-615 in 3-bit flow space. The first flow region 605 illustrates the flow region received at network location a. In this example, the input flow region 605 is the entire 3-bit flow space representing a fully wildcarded bitstream of "***". In some embodiments, the analysis application(s) use as input a flow region that spans the entire flow space (i.e., with every packet header field fully wildcarded), while other embodiments set certain fields (e.g., input ports).

The input flow region 605 is used as an input to the transfer function T1( ) and the second flow region 610 shows the output of the transfer function. This second flow region 610 represents all possible outputs that can result from a match of the flow entry F1, at which point the first bit has been resolved to a "1". This could be because the flow entry F1 only matches packets with a "1" for the first bit, or because the action specified by this flow entry sets the first bit to "1".

The second flow region 610 is then used as an input to the transfer function T2( ), and the third flow region 615 shows the output of this second transfer function. The third flow region 615 represents all possible outputs that can result from subsequent matches of the flow entries F1 and F2, at which point both the first and third bits have been resolved to "1", with the flow region being "1*1", with only the second bit wildcarded. In theory, the output flow region for a set of subsequent flow entries could be empty, if the flow entries were such that no packet could ever match them in the particular order.

As in the example of FIG. 6, the analysis application of some embodiments uses the transfer functions to model flow entries in order to determine various properties of a flow entry or a sequence of flow entries. For example, a user (e.g., network administrator) may want to identify the entire range of possible outputs from a particular sequence of flow entries $F_1 \ldots F_N$. The application can use the corresponding transfer functions $T_1 \ldots T_N$ to calculate the result of this sequence of flow entries on an initial headerspace (or flow region) $FR_I$, as $T_N(\ldots (T_1(FR_I))\ldots)$. The initial flow region $FR_I$ might be a fully wildcarded flow space, or have certain bits or fields set based on actual input that could be received at a particular MFE. In order to identify all of the possible outputs for the flow entry $F_N$, the application of some embodiments repeats this calculation for each possible sequence of flow entries that leads to $F_N$.

In some embodiments, the flow entry analysis application also generates inverse transfer functions for each flow entry, which map an output flow region to an input flow region for the flow entry. As will be described in further detail below, the inverse transfer functions are used in some embodiments to identify equivalency classes for test packets used to test an implementation of a logical network.

To perform the various flow entry analysis applications, some embodiments model the packet header according to a set of fields rather than as an n-bit space, the range of which may be limited by a number of available bits or other factors. For instance, register values may be allotted different numbers of bits in different embodiments, VLAN ID or MAC address fields are set sizes in the packet header, etc.

Figure 7:
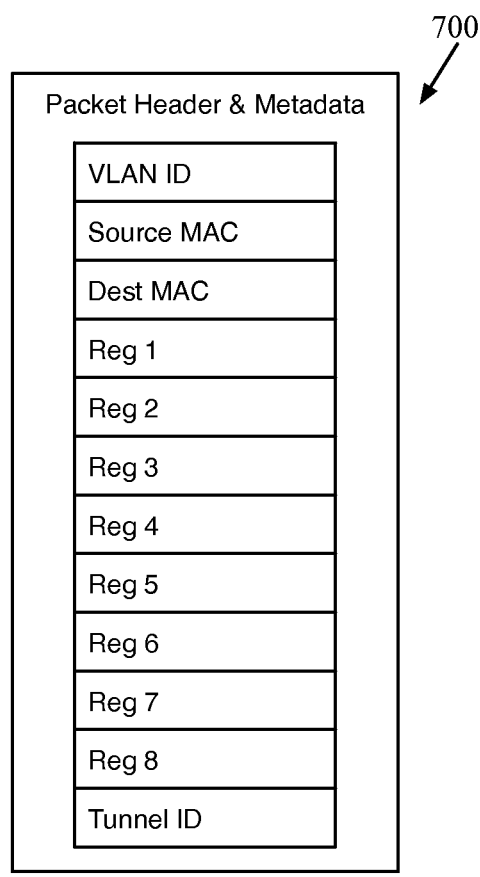
FIG. 7 conceptually illustrates a data structure representing a packet header and accompanying metadata in some embodiments.

FIG. 7 conceptually illustrates a data structure 700 representing a packet header and accompanying metadata in some embodiments. In some embodiments, the flow reachability or other analysis application stores packet headers as data structures such as objects, with the transfer functions representing flow entries behaving as functions that modify these objects. As shown, the packet header data structure 700 includes fields for the VLAN ID, source MAC address, destination MAC address, eight registers, and a tunnel ID (sometimes referred to as register 0). The eight registers, in some embodiments, represent data structures stored in memory by the managed forwarding element that processes a packet in order to keep track of various packet information while processing the packet over multiple stages. For instance, some embodiments use one or more of the registers (e.g., reg1) as a context register to keep track of (i) the logical forwarding element (e.g., logical switch, logical router, etc.) processing a packet and (ii) the current stage of processing (a value which can be incremented to pass the packet from one stage to the next). In addition, the registers can be used to store ingress and egress port numbers, intermediate values when a single operation is split into multiple stages, etc.

One of ordinary skill in the art will recognize that this data structure 700 represents merely one example of a set of packet header fields for use in headerspace analysis. Some embodiments may have more or fewer registers, as well as layer 3 and layer 4 packet header fields (e.g., source and destination IP addresses, source and destination transport layer port numbers, transport protocol type, etc.) rather than just the layer 2 fields.

Figure 8:
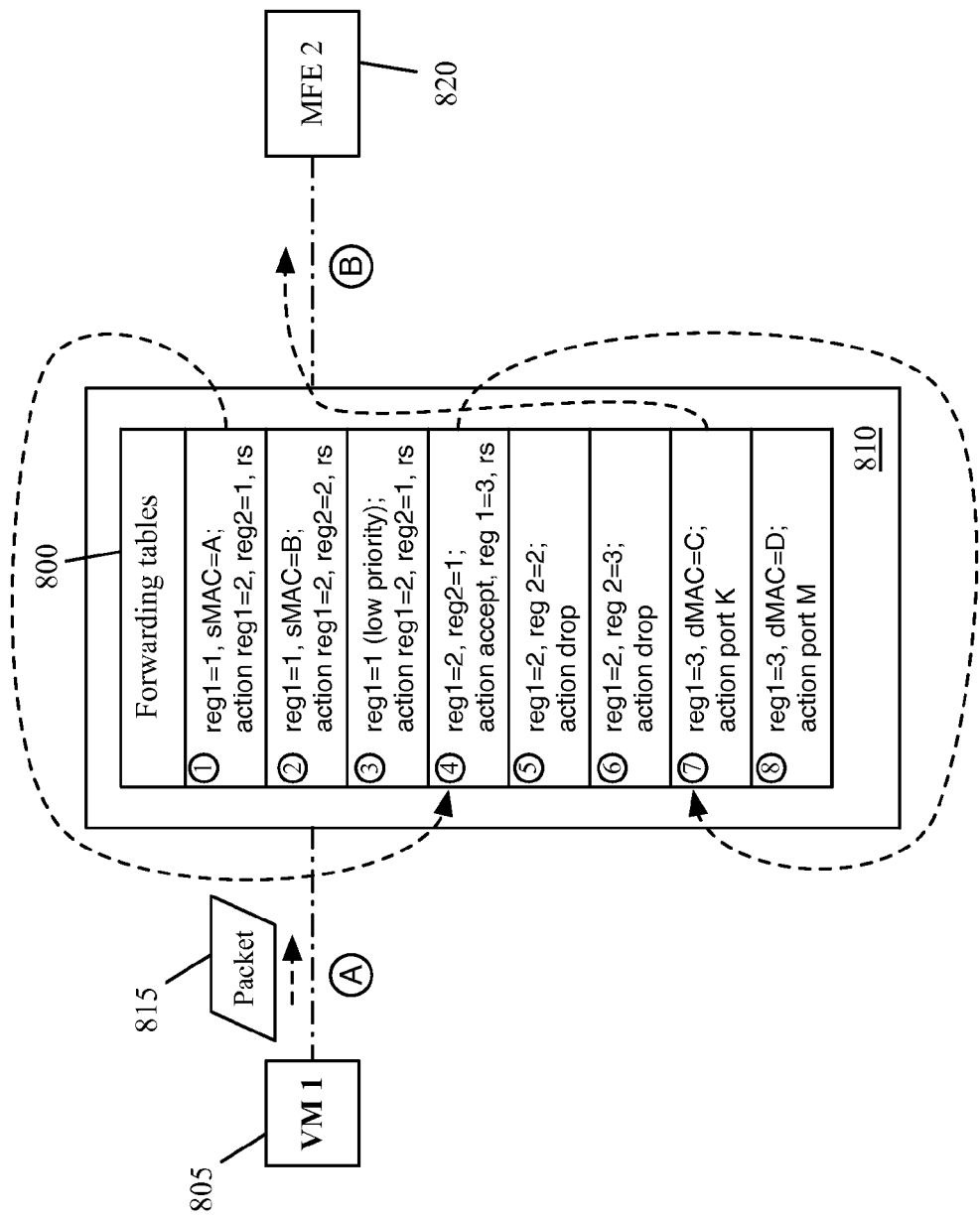
FIG. 8 conceptually illustrates a forwarding table with eight flow entries, including one flow entry that is unreachable, to show an example of how the packet header fields are used in a simplified forwarding table.

FIG. 8 conceptually illustrates a forwarding table 800 with eight flow entries, including one flow entry that is unreachable, to show an example of how the packet header fields are used in a simplified forwarding table. This figure also illustrates an example path through the forwarding table 800 for a packet received from a VM 805 by the managed forwarding element 810 that implements the forwarding table. As shown, each of the flow entries includes one or more match conditions (referred to as its "flow expression") and one or more actions. For example, the first flow entry (labeled with an encircled "1") has match conditions on the fields register 1 and source MAC address. If matched, this flow entry specifies for the MFE 810 to modify the register 1 value, load a value into register 2, and resubmit ("rs") the packet for further processing. In the examples described herein, the MFE uses register 1 ("reg1") as a context register, which divides the flow entries into stages. Any flow entry that does not specify to either drop a packet or send the packet out a specific port causes the MFE to increment this context register such that the packet will match one of the flow entries for a next stage after resubmission.

The example path shows that a packet 815 is received at network location A (i.e., at a physical input port to which the VM 805 connects). The path of the packet through this MFE 810 will be described for a single packet having fully-defined packet headers. As described below, however, some embodiments use at least partially wildcarded packet headers for the flow reachability analysis, and examine the various different paths that the packet could take through the forwarding tables.

The packet 815 has its context register initially set to the value "1" upon being received. As such, it matches the first flow entry 1 based on its source MAC address ("A"). This flow entry, as shown, specifies for the MFE to increment the context register reg1 (to the value "2"), load the value "1" into another register reg2, and resubmit the packet for additional processing.

Subsequently, the packet matches one of the flow entries at the next stage (those that match the value "2" for the context register reg1). Specifically, because the register reg2 stores the value "1", the packet matches flow entry 4, which specifies to accept the packet, increment the context register, and resubmit the packet. At the next stage, the packet matches flow entry 4 (based on its destination MAC address value "C"), which specifies to output the packet to port K (a tunnel to the second MFE 820), shown as network location B in the figure.

II. Flow Entry Reachability Analysis

One usage of headerspace analysis is in determining flow entry reachability, and removing unnecessary flow entries from MFEs in a logical network implementation, thereby reducing memory usage on the MFE. Some embodiments define a second flow entry as reachable from a first flow entry when a packet resulting from the output of the first flow entry could match the second flow entry. In some embodiments, the actions specified by the first flow entry direct an MFE to modify the packet header values of the packet (and the match conditions may also resolve otherwise wildcarded values), and the packet is then resubmitted to the MFE for further according to the second flow entry. In other embodiments, the first and second flow entries are on different MFEs, and the first flow entry specifies for a first MFE to send the packet via a tunnel to a second MFE. Specifically, some embodiments define a target flow entry as reachable from an initial flow entry when the range of possible results between the flow entries returns a non-empty set. Some embodiments, however, rather than being concerned with the reachability of a second flow entry from a first flow entry, determine all possible packet paths through the flow entries and identify which flow entries are not reachable by any paths.

Some embodiments use further operations to identify additional flow entries that are not reachable on a particular MFE. In some embodiments, the flow analysis application annotates the first flow entry (called a leaf flow entry) used to process a packet entering the MFE. The network controller also annotates the flow entries that send and receive packets over tunnels (called a send tunnel flow entry and a receive tunnel flow entry).

The flow analysis application of some embodiments determines whether the leaf flow entries are necessary for a particular MFE (e.g., whether the leaf flow entries will ever be used on a particular managed forwarding element). For example, the first flow entry for receiving a packet directly from a particular logical port will not be used if the virtual machine that corresponds to the particular logical port is not connected to the particular MFE. Using this data, the flow analysis application can calculate the set of flow entries reachable from the leaf flow entries, and also keep track of their EFR. Flow entries only reachable from flow entries deemed unreachable will themselves be unreachable.

The flow analysis application, in some embodiments, calculates the EFR of receive tunnel flow entries based on the EFR of the send tunnel flow entries of the forwarding elements on the other side of the tunnels. The application calculates the set of flow entries reachable from receive tunnel flow entries and also keeps track of their EFR. An analytic application of some embodiments uses the tracked EFRs to identify the flow entries that can be reached from the corresponding flow entries.

The calculated flow reachability can also be used to determine feature impact in some embodiments. The flow entries generated by a control plane are annotated with the features that generated the particular flow entry (e.g., ACL, port sec, etc.). The network controller of some embodiments then uses the annotations to calculate the minimum number of flow entries on which each feature depends. The calculated flow entry reachability can also be used to determine allowed packets. Given a pair of ports, the allowed packets are the set of packets that can be sent from one of the ports to the other, based on EFR.

Figure 9:
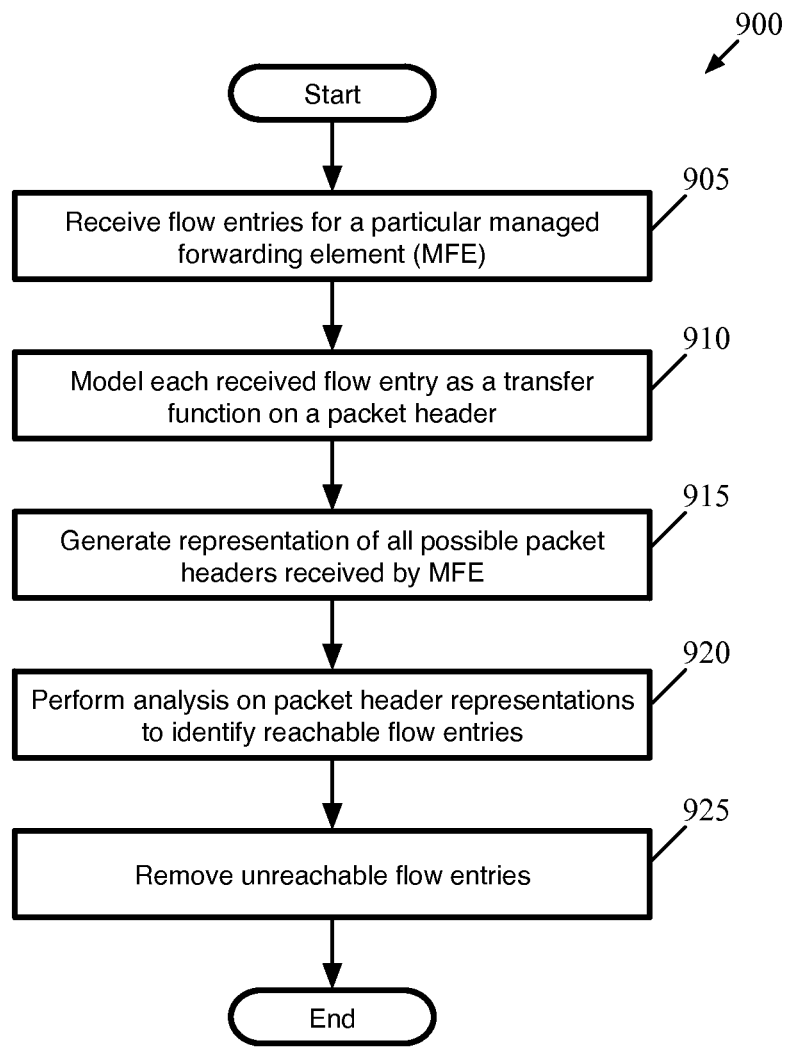
FIG. 9 conceptually illustrates a process of some embodiments for identifying and removing unreachable flow entries from an MFE.

FIG. 9 conceptually illustrates a process 900 of some embodiments for identifying and removing unreachable flow entries from an MFE (i.e., flow entries that will never be used on the MFE). In some embodiments, the process 900 is performed by a network controller after the network controller generates flow entries for a logical network. For example, in an environment that uses powerful servers for the network controllers, and does not require flow entries to be distributed immediately after they are generated, the process 900 could be performed for each MFE in the system each time new flow entries are generated based on logical network state updates.

Other embodiments, however, perform the process 900 in a testing situation before the network controllers and logical networks are deployed. For instance, before deploying a set of network controllers to manage a network, the physical network administrator (e.g., a private enterprise datacenter owner) could specify the network setup (e.g., the various ACL and other rules to have in place). Flow reachability analysis can then be performed to identify which flow entries do not need to be distributed to the managed forwarding elements, and the flow entry generation process (e.g., the table mapping engine, in some embodiments) adjusted accordingly before deployment, so that these unnecessary flow entries will not be generated during the actual deployment.

As shown, the process 900 begins (at 905) by receiving flow entries for a particular managed forwarding element. The flow entries are those that a network controller has generated for distribution to the particular MFE. In addition, in some embodiments, the flow entries also include entries that would be generated at the MFE according to learning actions (e.g., actions that simulate traditional L2 learning). In some embodiments, the flow reachability analysis actually performs two iterations of the process 900, in order to first simulate the generation of these learned flow entries and then determine whether additional flow entries become reachable with the new flow entries in place.

As mentioned, some embodiments perform this process for each MFE in the system. In addition, as described below, in some embodiments the analysis for the different MFEs in a system is interactive based on the sending of packets between the MFEs via tunneling protocols. The flow entries may be reachable not just by packets sent directly to the MFE from locally-attached VMs, but also packets received from another MFE through a tunnel.

The process 900 models (at 910) each of the received flow entries as a transfer function operating on a packet header. As noted above, in some embodiments, rather than treating the packet headerspace as a set of L+M bits, the headerspace is modeled as a set of fields based on the packet header and additional metadata stored by the MFEs for a packet. A transfer function T operates on a set of fields $\{f_1, f_2, \ldots f_N\}$, mapping a first set of values in this space to a second set of values in the space.

In some embodiments, the transfer function for a particular flow entry only operates on certain portions of the headerspace (i.e., those portions that satisfy its match conditions and are affected by its actions). For example, the transfer function generated for the first flow entry 1 from FIG. 8 above only operates on the portions of headerspace in which the reg1 field could equal "1" and the source MAC address could field equal "A". Thus, packets with the reg1 field or the source MAC field wildcarded could match on this flow entry, but not packets in which either of these fields is set to a definite value other than that specified. In addition, the output of this transfer function will map this portion of the headerspace to a definite resolved value for both the match conditions (i.e., the output packet header has a definite source MAC of "A") and the actions taken (i.e., the output packet header has a definite reg2 value of "1, with values specified by the actions superseding the values resolved by the match conditions (e.g., the reg1 field will be mapped to the value "2" based on the specified action). All fields that are not affected by the flow entry are mapped to their input value, whether this is a wildcarded value or a specific value.

The process 900 also generates (at 915) a representation for all possible packet headers received by the MFE. In some embodiments, the analysis application does not begin with a fully wildcarded packet header and set of registers, because this would match all flow entries, and would fail to account for the stage-by-stage nature of the MFE processing of some embodiments. Thus, some embodiments set the context register of the packets to indicate that they are newly received packets, as well as generate representations for the various input ports at which a packet can be received. Instead, various packet headers will be input into the analysis application for the reachability analysis (e.g., packets from each possible input port, with the context register set but the packet otherwise fully wildcarded). As described above, some embodiments create each of the packet header representations as an object, then use the transfer functions to manipulate the values of these objects.

With the inputs (packet headers) and operations (transfer functions) determined, the process performs (at 920) analysis on the packet header representations to identify the reachable flow entries. As described in detail below by reference to FIG. 11, some embodiments use a recursive process that processes each packet header in a depth-first manner. That is, the analysis application follows a path through a sequence of flow entries for a packet header, marking the flow entries that a packet could match. When the packet processing is complete (i.e., the packet has matched a flow entry specifying to drop the packet or deliver the packet to its destination), the analysis application returns the packet to a previous stage in which it could have matched multiple flow entries (based on wildcarded fields), then chooses a different flow entry to complete the path. In this manner, the analysis application identifies all of the flow entries that a packet header could match.

As described in greater detail below, this analysis may account for tunneling a packet between MFEs (i.e., by using the output packets from the analysis of one MFE as input packets to the analysis of another MFE). In addition, the analysis may account for learning actions specified by the flow entries, by performing the analysis twice (a first time to generate new flow entries based on the learning actions, and a second time to determine additional reachable flow entries that are reached by paths through the generated flow entries).

Once the analysis has been performed to identify the reachable flow entries (i.e., those that could be matched by a packet sent to the MFE), the process removes (at 925) the unreachable flow entries. In some embodiments, when the analysis application runs on a deployed network controller, this entails preventing the controller from distributing the flow entries to the MFE, or sending a command to the MFE to remove the flow entries from its memory. In other embodiments, the analysis application operates on a network controller or associated computer in a pre-deployment fashion. In such embodiments, the removal entails modifying the flow entry generation process (e.g., modifying a table mapping engine) of the network controller for its deployment.

A. Recursive Analysis Process

Figure 10:
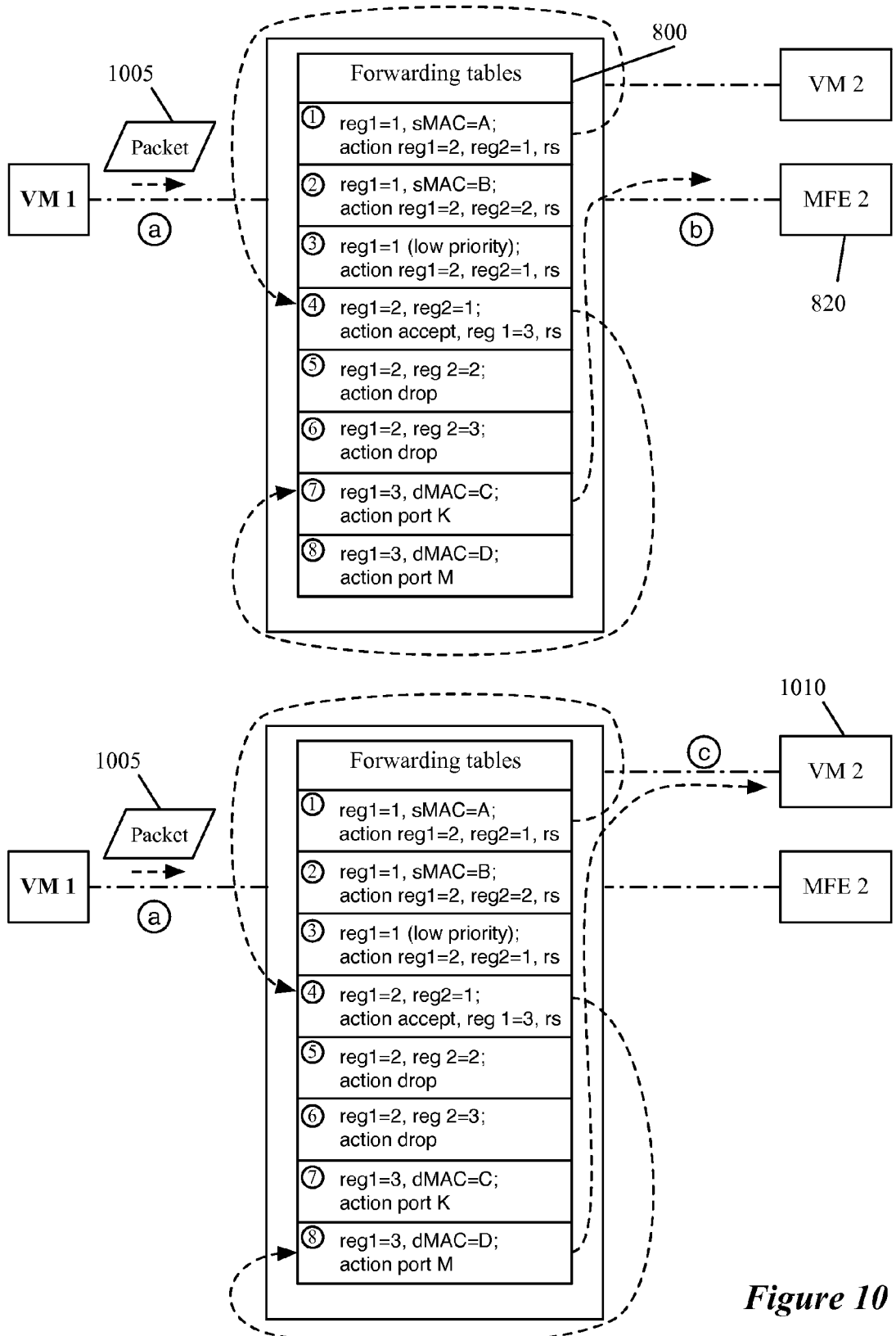
FIG. 10 illustrates multiple possible paths through the forwarding tables of FIG. 8 for a packet that has a wildcarded destination MAC address field.

As described above, in some embodiments, the flow reachability analysis process examines multiple possible packet headers as inputs to a set of flow entries, and determines multiple possible paths through the set of flow entries for each packet header, if several such paths exist due to wildcarding of one or more packet header fields. FIG. 10 illustrates multiple possible paths through the forwarding tables 800 of FIG. 8 for a packet that has a wildcarded destination MAC address field. This is a common field to wildcard, because a VM in a network could, in theory, send a packet to any MAC address.

Thus, the top half of FIG. 10 illustrates the same path as shown in FIG. 8, with a packet 1005 first matching flow entry 1, then flow entry 4, then flow entry 7, which sends the packet out to a different MFE 820. The bottom half of the figure illustrates a slightly different path, in which the packet 1005 again matches flow entry 1 and then flow entry 4, but subsequently matches flow entry 8. This flow entry specifies a different output port "M", which directs the packet to a network location "C", a port through which another VM 1010 on the host connects to the MFE 810.

In this case, several paths through the flow entries are possible. The first flow entry 1 will always send a packet to the flow entry 4, after which a packet could match either flow entry 7 or flow entry 8, depending on the destination MAC address as shown in this figure. As described below, in some embodiments a separate low priority flow entry will exist for handling packets unknown destination MAC addresses (i.e., destination MAC addresses for which the flow entries do not yet exist). In addition, a packet could match either flow entry 2 or flow entry 3, and then would be subsequently sent to flow entry 5 and dropped. However, because the register reg2 value will never equal "3", the sixth flow entry 6 will never be matched, and thus can be removed as unnecessary.

In some embodiments, the recursive flow entry reachability analysis process identifies all of these possible paths through a set of flow entries in an MFE or across multiple MFEs. One of ordinary skill in the art will recognize that the examples shown herein are simplified sets of flow entries. In many logical networks, hundreds or thousands of flow entries will be generated for each MFE. In addition, the processing through the MFE may encompass numerous stages (e.g., twenty or more stages, in some cases). Because of the large number of flow entries that may be generated, identifying flow entries that can be removed from the system may provide significant benefit in terms of memory usage.

Figure 11:
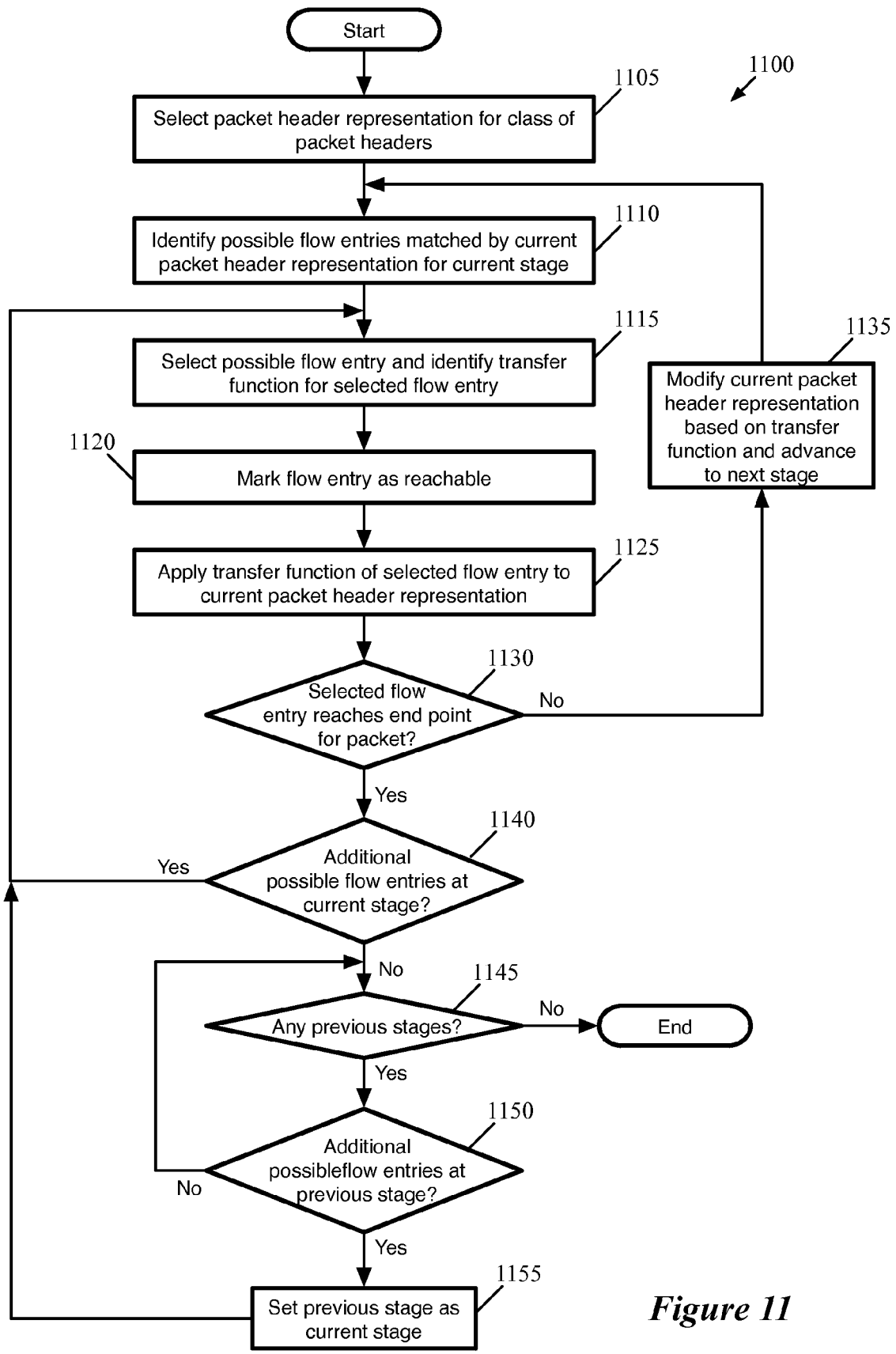
FIG. 11 conceptually illustrates a process 1100 of some embodiments for processing a single packet header representation through a set of flow entries.

FIG. 11 conceptually illustrates a process 1100 of some embodiments for processing a single packet header representation (which may include wildcard fields) through a set of flow entries. The process assumes that not all of the packet header fields are wildcarded, however. For example, in this process the flow entries are organized in stages (e.g., ingress port mapping, one or more ACL stages, logical forwarding stages, tunneling stages, etc.), and the context register that identifies the stage is set to the value corresponding to the first stage upon input. Some embodiments also set the physical input port for the input packet header representation (a value stored in the metadata, in some embodiments).

The set of flow entries, in some embodiments, may be the flow entries generated for a logical network for a single MFE. However, the set of flow entries could include the flow entries generated for multiple MFEs, in which case the analysis includes simulating the sending of a packet through tunnels between the MFEs, which will be described in greater detail below in subsection B.

As shown, the process 1100 begins by selecting (at 1105) a packet header representation for a class of packet headers. As indicated, this packet header representation may not represent a single specific packet, but rather a set of possible packets that could be received by an MFE for a particular logical network. Thus, while some aspects of the packet might be defined in the packet header representation (e.g., the input port and the context register), many of the other fields will be wildcarded in the packet header representation (e.g., the destination MAC address, the VLAN ID (if used), etc.). Some embodiments wildcard the source MAC address, to simulate undesired MAC address spoofing. Similarly, if the flow entries include L3 routing, some embodiments wildcard both the source and destination IP addresses.

The process then identifies (at 1110) possible flow entries for the current stage matched by the current packet header representation. Initially, this will be the flow entries at the first packet processing stage that match the initially input packet header representation. Because of the wildcarded fields in the packet header representation, the packet header may match numerous flow entries at a particular stage. If the first stage matches on the physical input port in order to map this to a logical ingress port, then there might be only one matching flow entry. On the other hand, stages matching over a MAC address (either destination or source MAC) or other wildcarded field might have numerous possible matches. In some embodiments, the process 1100 stores all of the identified possible matched flow entries along with the current representation of the packet header, so that the recursive process can apply each of the flow entries to the packet representation before completing.

Next, the process 1100 selects (at 1115) one of the flow entries identified at operation 1110 and identifies the transfer function for the selected flow entry. In some embodiments, the flow entry is simply represented by the transfer function, and therefore selecting the flow entry is selecting the transfer function. Other embodiments, however, store a data structure for each flow entry and have a separate function representing the flow entry that operates on the packet header representations. In general, the order in which the flow reachability analysis application selects the possible flow entries for a particular stage is not of consequence. Thus, the process 1100 may select these flow entries in an order in which they are stored by the application, in a random order, etc.

Upon selection of the flow entry for analysis, the process marks (at 1120) the selected flow entry as reachable. In some embodiments, this entails modifying a flag that is part of a data structure representing the flow entry (e.g., changing a bit value from 0 to 1). If the flow entry is already marked as reachable (e.g., because the flow entry had already been matched during a previous iteration through the current stage, or by a previous packet header representation), then the application does not modify this status.

Next, the process 1100 applies (at 1125) the transfer function for the selected flow entry to the current packet header representation. As described above, this modifies the current packet header representation according to the transfer function. Some fields may stay constant (i.e., if the fields are wildcarded they remain wildcarded), while other fields are resolved (e.g., if a flow entry matches over a wildcarded field or specifies an action to set a wildcarded field, such as a register) or modified (e.g., incrementing of a context register that identifies the current stage). Some embodiments also store the pre-modification packet header representation for use with the other possible flow entries for the current stage that were identified at 1110, as these will be applied to the pre-modification packet header representation.

The process 1100 then determines (at 1130) whether the selected flow entry reaches an end point for the packet. For example, some flow entries may specify for the MFE to drop the packet. At this point, the packet has reached an end point, and the processing is complete. In addition, the flow entry might specify to deliver the packet to a particular physical port (e.g., to a VM connected to the current MFE, to another MFE via a tunnel if the analysis is being performed for the flow entries of a single MFE, to an external network via a gateway, etc.).

When the currently selected flow entry does not cause the packet to reach an end point, the process 1100 modifies (at 1135) the current packet header representation based on the transfer function and advances to the next stage of packet processing. That is, the packet header representation as modified by the transfer function applied at operation 1125 is now set as the current packet header representation. Because this will typically involve modifying the context register, this modification encompasses the advancement of the stage. As the packet header has changed, the process returns to operation 1110 and identifies a new set of possible flow entries matched by the new current packet header representation for the new stage.

However, if the current selected flow entry causes the packet to reach an end point, the current path through the flow entries is complete. However, this does not mean that the analysis for the initially input packet header representation is complete, as the partially-wildcarded packet header may have numerous paths through the flow entries. Thus, the process next determines (at 1140) whether additional possible flow entries remain at the current stage. If, at operation 1110, multiple possible flow entries were identified that the current packet header representation matched, and the current packet header representation has not been processed through all of these flow entries, then the process returns to 1115 to select another of the identified flow entries. In this way, the process completes the processing at the most recent branching of the paths through the flow entries before moving back to previous stages.

If there are no more flow entries at the current stage, the process 1100 then determines how many stages backwards to move before continuing with the processing. Thus, the process determines (at 1145) whether there are any previous stages. If there are no more possible flow entries at the current stage, and there are no previous stages with possible flow entries, then the process has utilized all of the flow entries that the input packet header representation could possibly match, and the process 1100 ends.

On the other hand, if there is a previous stage, then the process determines (at 1150) whether there are additional possible flow entries at the previous stage. For example, if the most recent stage was a tunnel sending stage for which only one flow entry was identified, a previous stage might have been a logical forwarding stage (identifying a logical egress port) based on a wildcarded destination address. As such, the previous stage might have numerous additional flow entries through which to process the packet header representation. If there are no additional possible flow entries at the previous stage, the process 1100 returns to 1145 and continues working backwards until either (i) a stage with additional flow entries is reached or (ii) there are no more previous stages, indicating the end of the process.

When the previous stage does have additional flow entries, the process sets (at 1150) the identified previous stage with the additional flow entries as the current stage, and returns to operation 1115 to select another possible flow entry. Because the analysis application stores the possible flow entries identified at each iteration of operation 1110, the process will already have the possible flow entries for the current stage identified, and will have kept track of whether the flow entry has been processed for this stage. This is a separate piece of data than the reachability flag used at operation 1120, as a flow entry may need to be used multiple times for multiple different paths. That is, the flow entries cannot be modeled as a perfectly hierarchical tree, with each "child" flow entry at a later stage only having one "parent" flow entry at an earlier stage. As a simple example, if two VMs for the same logical network operate on the same host (and therefore connect to the same MFE), then packets from both of these VMs may match the same logical forwarding flow entry if the two VMs both send packets to the same destination MAC address.

After performing this process 1100 for all possible input packets, the flow reachability application will have effectively generated a flow entry reachability graph for an MFE or a system of MFEs. The flow reachability graph indicates all of the paths through the flow entries, and therefore which flow entries are used and which are not.

Figure 12:
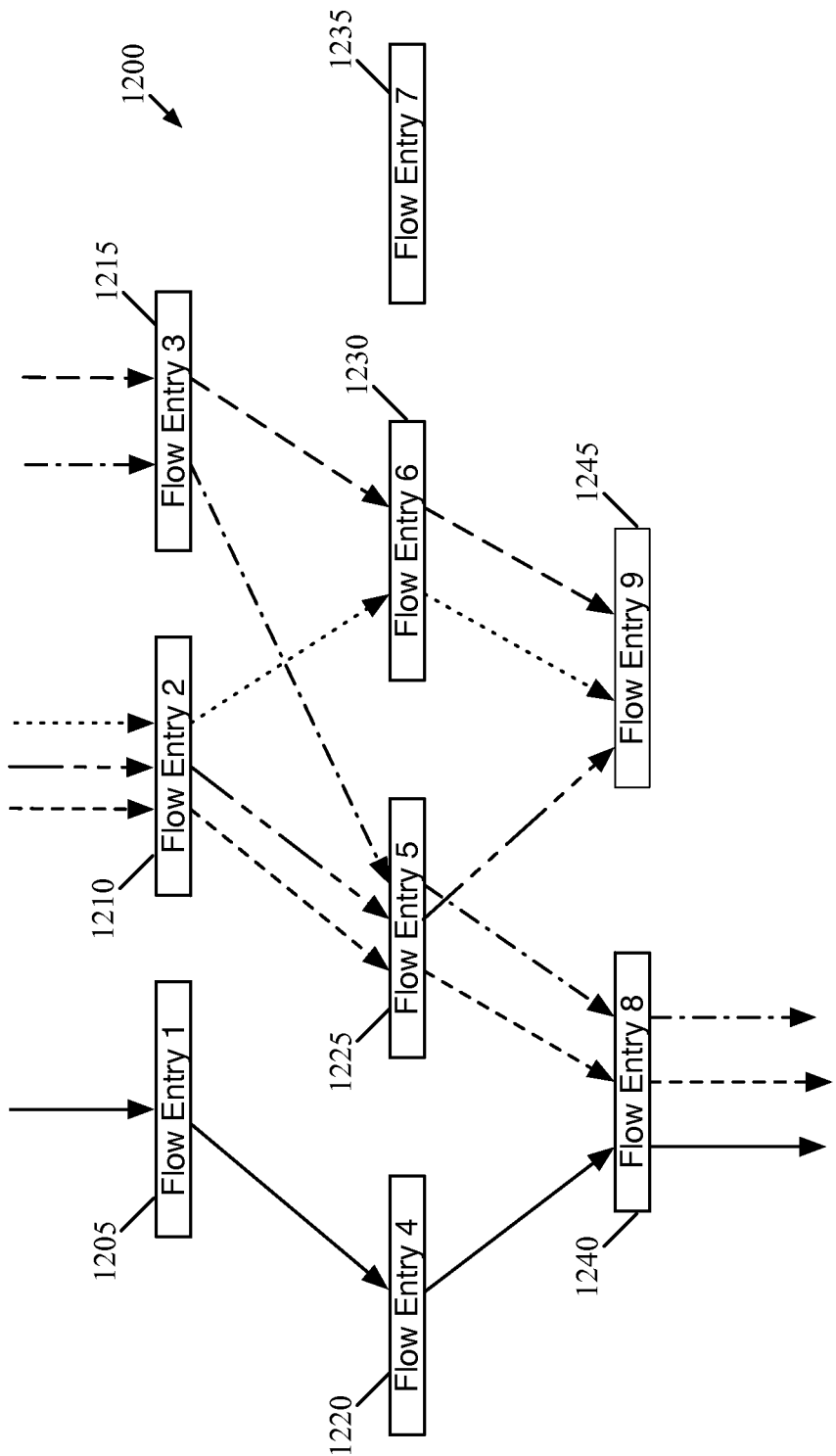
FIG. 12 illustrates a portion of a reachability graph for nine flow entries.

FIG. 12 illustrates a portion of such a reachability graph 1200 for nine flow entries. As shown, these flow entries are arranged in three consecutive stages (e.g., based on the context register match conditions of the flow entries). The first stage includes three flow entries 1205-1215, the second stage includes four flow entries 1220-1235, and the third stage includes two flow entries 1240-1245.

In this figure, each of several different paths through the flow entries is illustrated via a different type of solid, dotted, or dashed line 1250-1275. As shown, packets having different header field values may be processed by the same flow entry at one stage and then subsequently by different flow entries at the next stage. For example, the packets represented by the lines 1270-1275 each match the flow entry 1215, then subsequently match two different flow entries 1225 and 1230. In addition, packets that match different flow entries at one stage can then subsequently match the same flow entry at the next stage (e.g., the packets represented by the lines 1265 and 1275 match flow entries 1210 and 1215, respectively, at the first stage, but then both match the flow entry 1230 at the second stage. In some embodiments, when a flow entry B (e.g., the flow entry 1240) can be reached by multiple flow entries, A1, . . . , An, (e.g., the flow entries 1220 and 1225), the union of the flow regions of A1, . . . , An is referred to as the EFR (Effective Flow Range) of B. In some cases, the EFR for a flow entry may be smaller than the entire flow space.

In some embodiments, all or some of these paths could be generated during one performance of the process 1100 of FIG. 11. For example, using the paths 1255-1265 as an example, a partially wildcarded packet header representation might match only the flow entry 1210 at the first stage. At the second stage, the packet header representation matches either the flow entry 1225 (represented by the paths 1255 and 1260) and the flow entry 1230 (represented by the path 1265). The packet header representation that matches the flow entry 1225 next matches either flow entry 1240 or flow entry 1245, while the packet that matches flow entry 1230 matches the flow entry 1245 (which drops packets as its action).

Thus, following the process 1100, the packet header representation would have flow entry 1210 applied, then 1225, then 1240. At this point, reaching an end point, the process would return to the packet header representation prior to the application of the flow entry 1240, and apply 1245. As this is also an end point, and there are no more flow entries at the third stage, the process returns to the packet header representation prior to the application of the flow entry 1225, and applies flow entry 1230, then the flow entry 1245.

After applying the various flow entries to all of the possible input packet header representations, the flow reachability analysis identifies all of the paths through the flow entries, as shown by the various lines 1250-1275 in FIG. 12. This figure also illustrates that the flow entry 1235 is never used, indicating that the network controller generating these flow entries need not distribute (or even generate) the flow entry 1235.

B. Accounting for Tunnels

As mentioned, the flow reachability analysis of some embodiments may analyze the flow entries of a single MFE or multiple MFEs that connect within a network. Because the flow entries connect via tunnels, the input ports for a MFE include both the ports to which VMs directly connect as well as the tunnels through which the packets are sent and received. In addition, many flow entries (e.g., tunnel receive entries, egress ACL entries in some cases, etc.) will only be reachable via packets arriving via tunnels. Accordingly, some embodiments factor in these packets, using as input the output packet header representations generated by a process such as the process 1100 when the end point flow entry was a tunnel sending flow entry.

Figure 13:
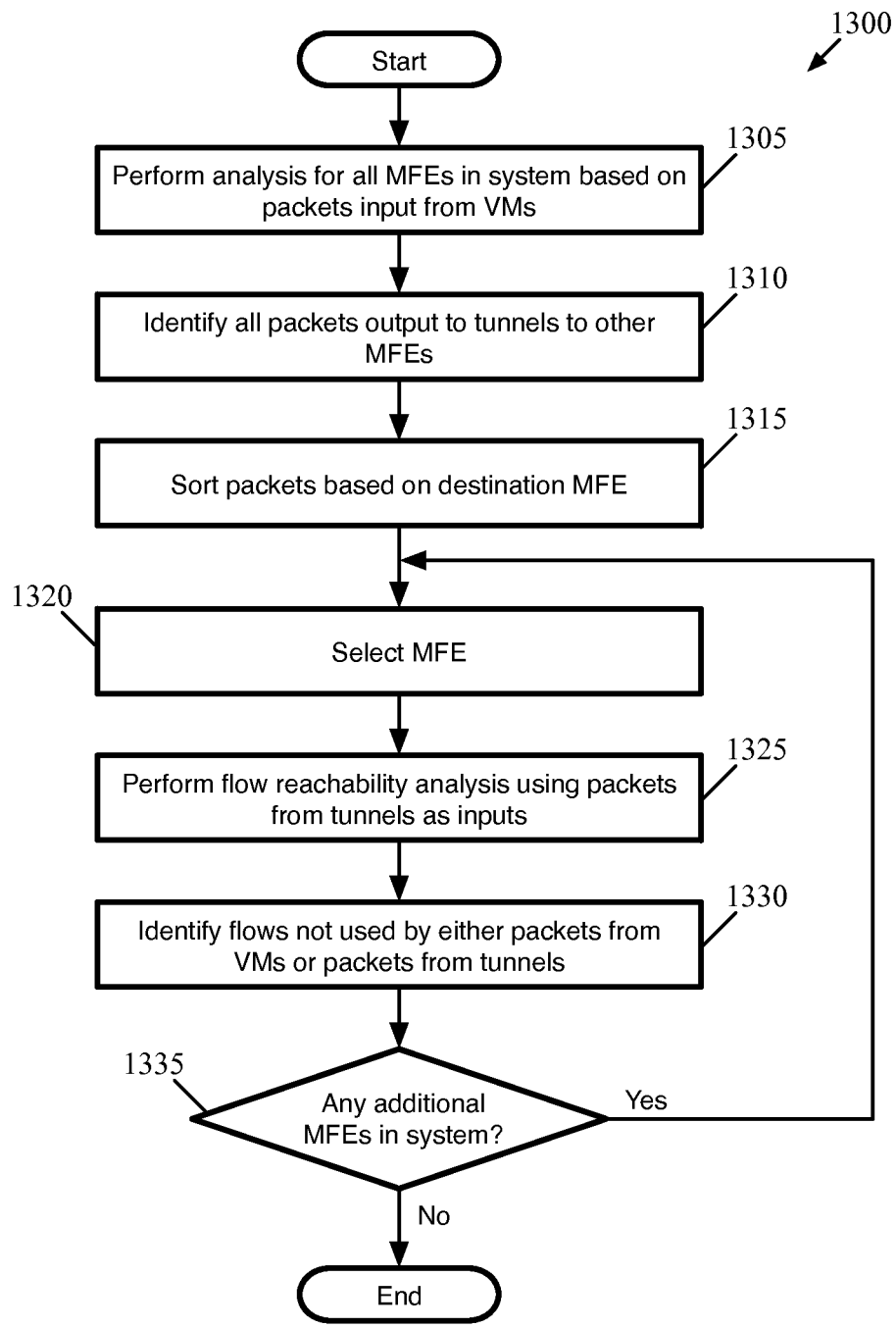
FIG. 13 conceptually illustrates a process of some embodiments for performing flow reachability analysis to account for tunneled packets.

FIG. 13 conceptually illustrates a process 1300 of some embodiments for performing flow reachability analysis to account for tunneled packets. As shown, this process 1300 begins by performing (at 1305) analysis for all MFEs in a system based on packets input from VMs directly connected to the MFEs. For example, a flow reachability analysis application might perform one or more iterations of the process 1100 in some embodiments, using the flow entries that send a packet out via a tunnel as end points for a path through the flow entries.

The process 1300 then identifies (at 1310) all packets output to tunnels to other MFEs based on this analysis. That is, each packet header representation for which the endpoint is a tunnel send action is identified for further processing. This may result in numerous different packet header representations for each tunnel, depending on the flow paths. For example, if two VMs are located on the same MFE, then both of these may send packets to a third destination VM over the same tunnel. Some embodiments may identify certain fields that can be wildcarded at this point and thereby combine overlapping packet header representations; however, in a complex system with ACL rules, doing so may create problems, so other embodiments do not perform any wildcarding and use the packet header representations as sent into the tunnel.

Next, the process sorts (at 1315) the packets based on the destination MFE. This may include packets sent through numerous different tunnels to the destination MFE from different source MFEs and, as indicated in the previous paragraphs, several different packets sent through the same tunnel. Sorting the packets by the destination MFE allows the flow analysis application to then perform additional processing for each MFE using these packet headers as inputs. Thus, the process 1300 selects (at 1320) one of the MFEs (e.g., in a random or other order).

The process then performs (at 1325) flow reachability analysis using packets sent to the selected MFE via tunnels as inputs. In some embodiments, this analysis is the same analysis performed at operation 1305 to determine all of the reachable flows via a set of input packets. For example, some embodiments perform the operation 1100 for each packet header representation sent to the MFE via a tunnel, which identifies paths through the flow entries of the MFE (and therefore which flow entries are used and which are not).

Next, the process 1300 identifies (at 1330) the flow entries that are not used by either packets received by the MFE from VMs or via tunnels from another MFE. These are the flow entries that are not marked during either the flow reachability analysis performed at operation 1305 or the flow reachability analysis performed at operation 1325 for the MFE. In some embodiments, these flow entries can be removed from the MFE (i.e., not generated or not distributed to the MFE).

The process 1300 determines (at 1335) whether there are any additional MFEs in the system for which to perform the flow reachability analysis using the tunnel input packets. When flow entries for all of the MFEs have been analyzed, the process 1300 ends. Otherwise, the process returns to operation 1320 to select another MFE and identify the unused flow entries for that MFE.

Figure 14:
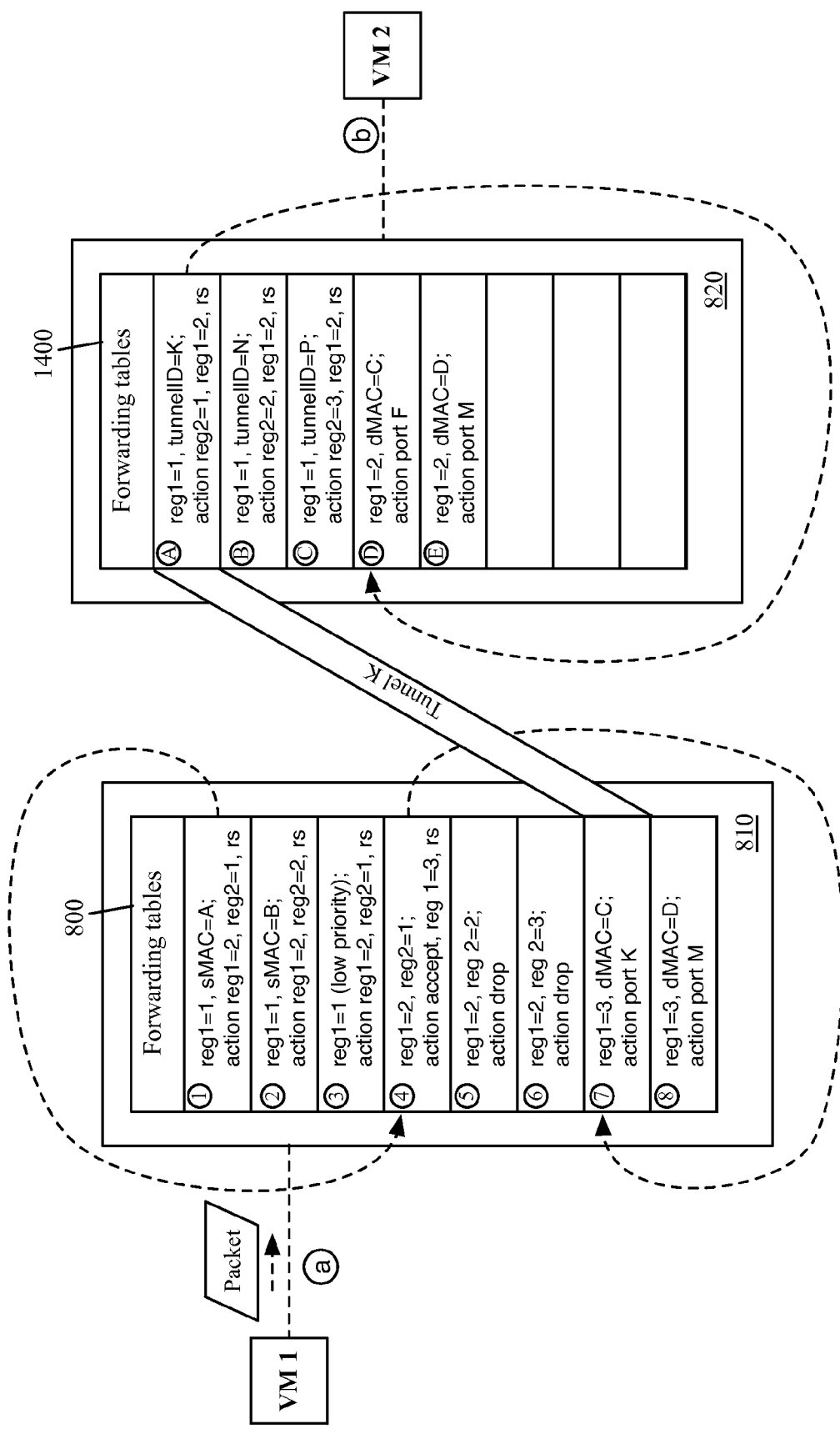
FIG. 14 illustrates an example of a path through a set of flow entries distributed over two MFEs for a packet sent through a tunnel between the MFEs.

FIG. 14 illustrates an example of a path through a set of flow entries distributed over two MFEs for a packet sent through a tunnel between the MFEs. In addition to the MFE 810 from FIG. 8, this figure also illustrates the forwarding tables 1400 of the second MFE 820. As shown, the packet is initially processed by the flow entries 1, 4, and 7 of the forwarding tables 800. As described above, this flow analysis application of some embodiments simulates this path using a packet header representation and applying transfer functions representing the flow entries to this packet header representation, to arrive at the decision to send the packet over a tunnel.

In a second round of processing, the flow analysis application analyzes the flow entries of the second MFE 820, using the output packet header representation from the first round as an input. This packet, received via the tunnel K, matches the first flow entry A, which increments the context register reg1 and sets another register reg2 to the value "1". Because these are highly simplified examples of flow entries, this reg2 value is not used by the subsequent flow entries. Based on the destination MAC address value "C", the packet next matches flow entry D, which outputs the packet to a port F. This port connects to a locally-connected VM, and therefore the packet has reached an end point in the analysis. For this packet header representation, the flow entries A and D will be marked as used at the MFE 820.

C. Learning Actions

As indicated above, some embodiments incorporate learning action into the flow entry analysis. In some embodiments, the MFEs use learning actions that generate additional flow entries. For example, when a managed forwarding element receives a packet for an unknown destination, the forwarding element may perform a type of L2 learning. In some embodiments, the managed forwarding element sends the packet to a service node, which is a specific type of managed forwarding element that handles broadcast, unknown, and multicast (BUM) packets, among other features. The service node, in addition to forwarding the packet to its destination, returns information to the managed forwarding element, allowing the forwarding element to create a new flow entry or set of flow entries such that future packets sent to the particular destination can be forwarded directly to their destination.

In such cases, the Flow Space is no longer covered by Flow Regions of all flow entries generated by a network controller for a MFE, since some flow entries will be dynamically generated by learning actions. In order to calculate flow entry reachability, the analysis application of some embodiments uses a process similar to the flow entry reachability calculation described above in Section II. During the process of calculating the flow entry reachability, the analysis application simulates the generation of new flow entries according to learning actions that are reachable. For each such flow entry, some embodiments generate new flow entries based on its EFR. As this can potentially affect reachability and EFR of other flow entries, the process repeats until flow entry reachability and EFR do not change (i.e., until no new flow entries are generated). The generated flow entries that are calculated for each flow entry with learning actions are included in the calculation in each iteration. In general, this will only require two iterations, but depending on the learning actions, and whether flow entries generated by learning actions in a first round cause other flow entries with learning actions to become reachable, additional iterations could be required.

Figure 15:
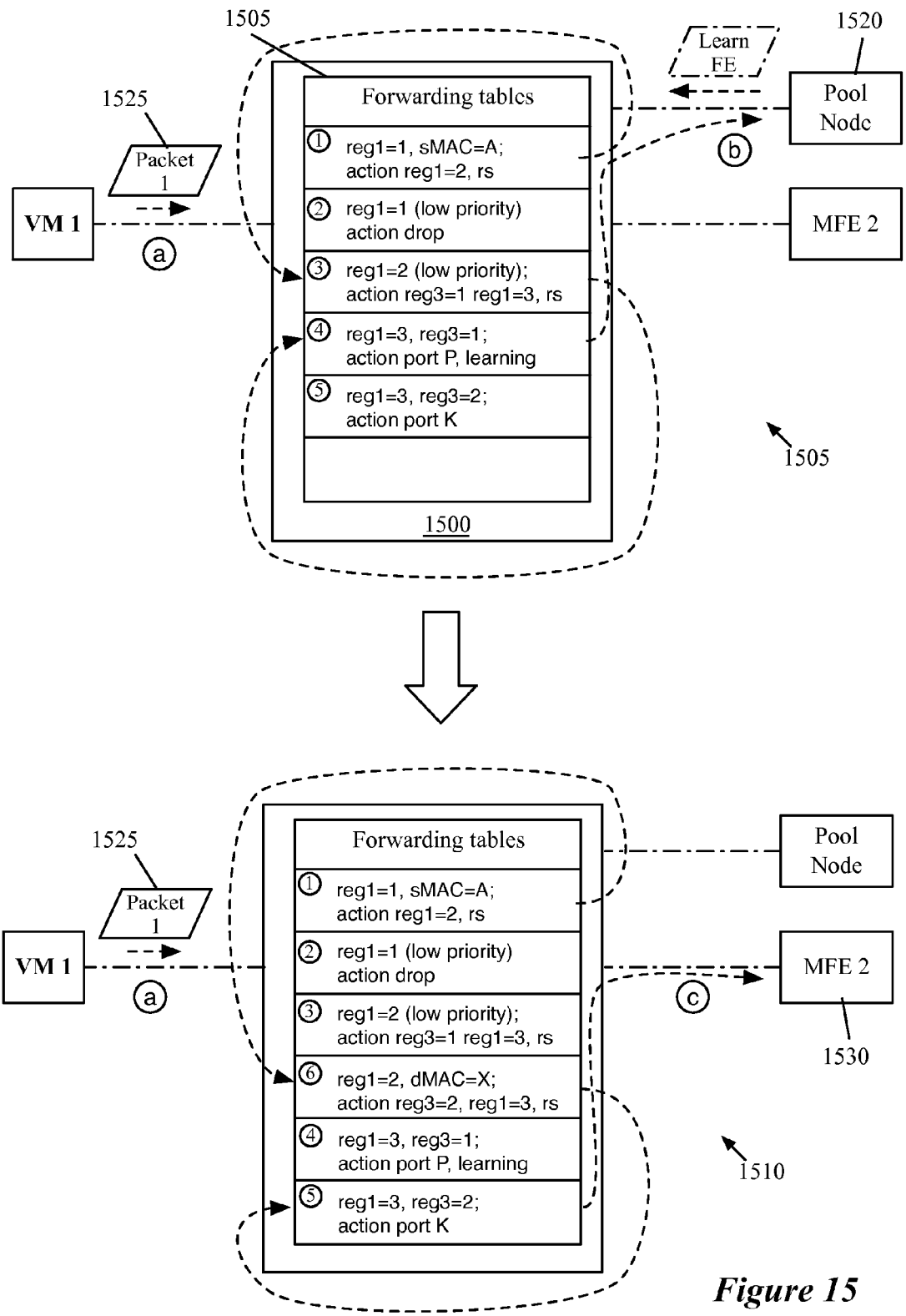
FIG. 15 conceptually illustrates the use of learning actions to generate a new flow entry in some embodiments.

FIG. 15 conceptually illustrates the use of learning actions to generate a new flow entry in some embodiments, over two stages 1505-1510 of a managed forwarding element 1500. The MFE 1500 includes a set of forwarding tables 1515 with five flow entries. In the first stage 1505 (i.e., simulated by a first iteration of the flow reachability analysis), a packet 1525 having certain properties first matches flow entry 1 (which effectively allows the packet based on its source MAC address), then matches a low priority flow in the second stage. This low priority flow specifies to set the register value reg3 to 1, which causes the flow entry to next match the flow entry 4.

This flow entry 4 specifies to output the packet to a port P, and also specifies a learning action. While simply shown here as "learning", one of ordinary skill in the art would recognize that in some embodiments the learning actions specifies how to create a new flow entry (i.e., how to learn the data for the flow entry, and how to populate the flow entry with the learned data). In this case, outputting the packet to the port P sends the packet via a tunnel to a pool node 1520. The pool node, in some embodiments, not only forwards the packet to its destination, but also sends information about the destination back to the MFE 1500.

The information received from the pool node allows the MFE to generate a new flow entry 6, and the analysis application of some embodiments simulates this flow entry generation. When a second packet 1525 having the same properties is sent (i.e., simulated in a second iteration of the flow reachability analysis), the packet again initially matches flow entry 1, but then in the second stage matches the newly created flow entry 6. This causes the packet to match flow entry 5, which outputs the packet into a different tunnel to a second MFE 1530. This is a flow entry that would not have been reachable in the first iteration, but is reached in the second iteration.

Figure 16:
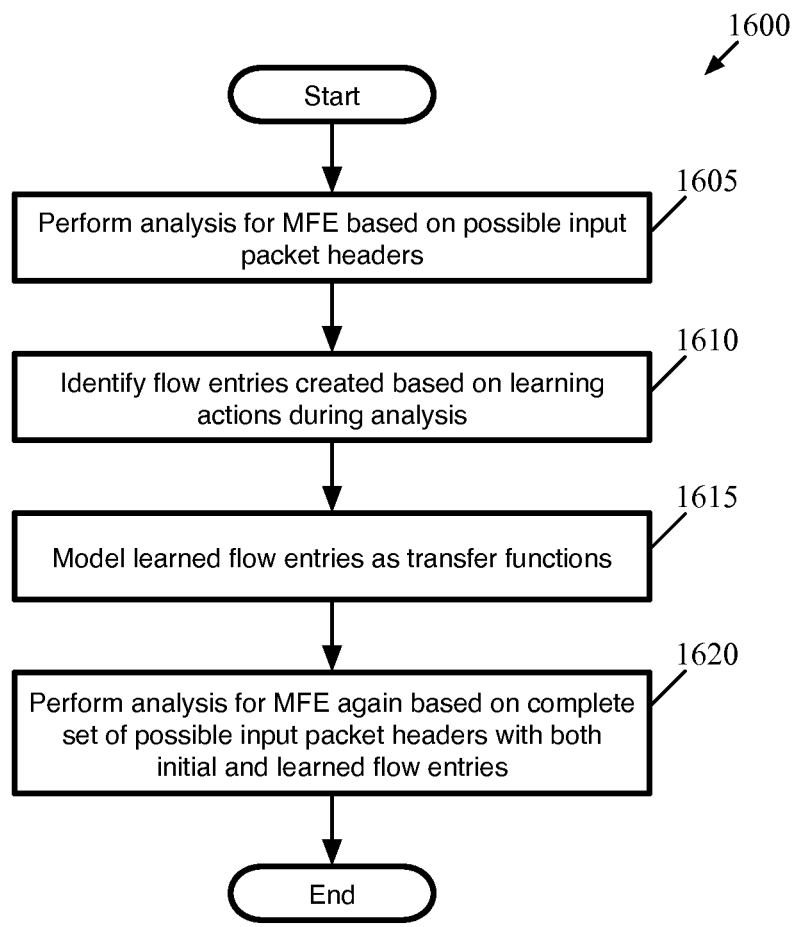
FIG. 16 conceptually illustrates a process of some embodiments for incorporating learning actions into the flow reachability analysis.

FIG. 16 conceptually illustrates a process 1600 of some embodiments for incorporating learning actions into the flow reachability analysis. As shown, the process 1600 begins by performing (at 1605) flow reachability analysis for a particular MFE based on possible input packet headers. Some embodiments use several iterations of the process 1100 or a similar process to perform this analysis. In addition, the analysis for the MFE may include using both packets from locally-connected VMs as well as packets received through tunnels as the inputs.

Next, the process 1600 identifies (at 1610) flow entries created based on learning actions during analysis. As mentioned, some embodiments include learning actions that simulate L2 learning for a logical network (i.e., mapping destination MAC addresses to logical ports, or mapping logical ports to physical destinations). In addition, in some embodiments, network address translation (NAT) or other middlebox services may be implemented via actions that create new flow entries.

For each identified new flow entry, the process models (at 1615) the flow entry as a transfer function. This modeling operation of some embodiments was described above by reference to FIG. 9, and entails generating a function that maps values for a certain set of header fields to a new set of header fields according to the match conditions and specified actions for the flow entry.

Next, the process 1600 performs (at 1620) flow reachability analysis for the MFE based on the complete set of possible input packet headers with both the initial and the learned flow entries. As mentioned, if this causes the creation of new flow entries, the process 1600 would in fact return to 1610 and perform the flow entry reachability analysis yet again, until no new flow entries are created and the full reachability graph can be generated. The process 1600 then ends.

III. Generating Test Packets

The above section described using headerspace analysis to determine flow reachability. Some embodiments use similar processes (i.e., the generation of the paths through flow entries) to generate a complete set of test packets for testing a physical implementation of a logical network, or for testing one or more paths between two network locations. To generate these test packets, after performing analysis of possible input packets, some embodiments identify paths (i.e., sequences of matched flow entries, in one or more managed forwarding elements) between a particular source and particular destination. By using the inverses of the transfer functions representing the flow entries in a path, a class of packets can be identified (e.g., with certain fields defined as wildcards). In order to test the flow entries in an implementation of the system, only one packet per packet class need be injected into the system, rather than numerous packets that follow redundant paths.

Thus, the flow analysis application of some embodiments generates inverse transfer functions for the flow entries. The inverse transfer functions, in some embodiments, map a given output flow region (i.e., region of packet headerspace) to the entire input flow region that could produce that output. Performing a transfer function on a first region to produce a second region and then performing the corresponding inverse transfer function on the second region will not necessarily return the same first region. That is, $T^{-1}(T(FR))$ does not necessarily equal FR. For example, the initial input region may not include all of the values which could produce the same result, or could include many values which do not produce any results.

Figure 17:
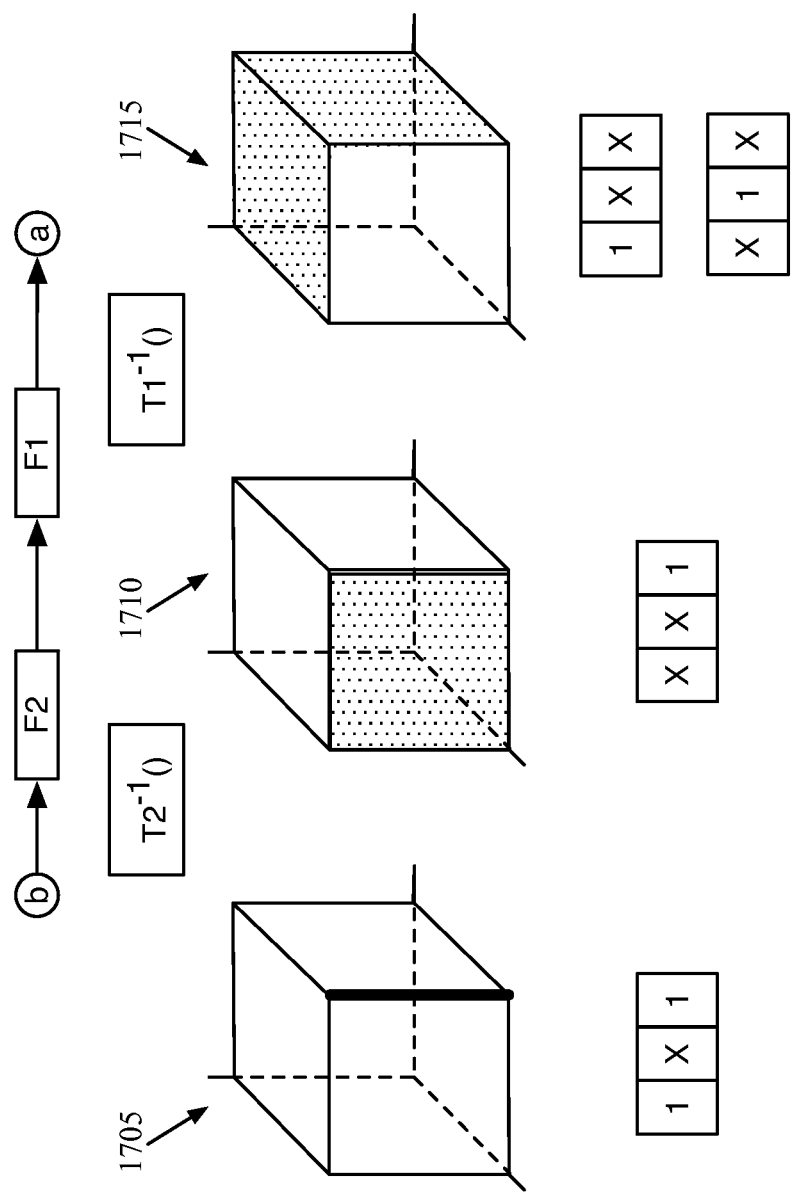
FIG. 17 illustrates an example of two inverse transfer functions operating on flow regions between two network locations.

FIG. 17 illustrates an example of two inverse transfer functions operating on flow regions between two network locations a and b. As with FIG. 6 above, the network locations a and b may represent logical ports of a logical switch, physical ports of a managed forwarding element, or intermediate stages of a packet as the packet is processed through one or more MFEs that implement a logical network. When sent from network location a to network location b, the packet matches two flow entries F1 and F2.

To work backwards from an output flow region at network location b to an input flow region at network location a, the flow analysis application generates the inverse transfer functions $T1^{-1}(\ )$ and $T2^{-1}(\ )$, each of which maps a flow region in a 3-bit flow space into a new flow region in that space. These functions are the inverses of the transfer functions $T1(\ )$ and $T2(\ )$, described above by reference to FIG. 6. As with the transfer functions, the inverse transfer functions are based on the match conditions and specified actions of the flow entries.

The effects of the inverse transfer functions $T1^{-1}(\ )$ and $T2^{-1}(\ )$ are shown in the three flow regions 1705-1715 in 3-bit flow space. The first flow region 1705 is the same as the flow region 615 that is output by $T2(T1(***))$, as shown in FIG. 6. Specifically, this flow region has the first and third bits resolved to the value "1" and the second bit wildcarded.

This first flow region "1*1" 1705 is used as an input to the inverse transfer function $T2^{-1}(\ )$, and the second flow region 1710 shows the output of this inverse transfer function. The second region represents the possible inputs that would (i) match the flow entry F2 and (ii) result in the output region 1705. While this region is not the same as the region 610 from FIG. 6 above, the two regions do overlap at the points "101" and "111" (i.e., the flow region 1705).

Next, the second flow region 1710 is used as an input to the inverse transfer function $T1^{-1}(\ )$, and the third flow region 1715 shows the output of this second inverse transfer function. The third flow region 1715 represents the inputs that can result in the output region of the flow entries F1 and F2 (i.e., flow region 1705). This flow region, the union of "1**" and "*1*", covers six of the eight points in the simplified flow space (all but the points "000" and "001".

These inverse transfer functions may be used to determine the set of input packets that will follow a path through a particular sequence of flow entries in one or more MFEs. One application of this allows a network administrator to identify classes of equivalent packets in order to test the implementation of a logical network. Specifically, identifying these test packets enables an administrator to test the paths between two network locations, without having to generate a huge number of test packets.

Figure 18:
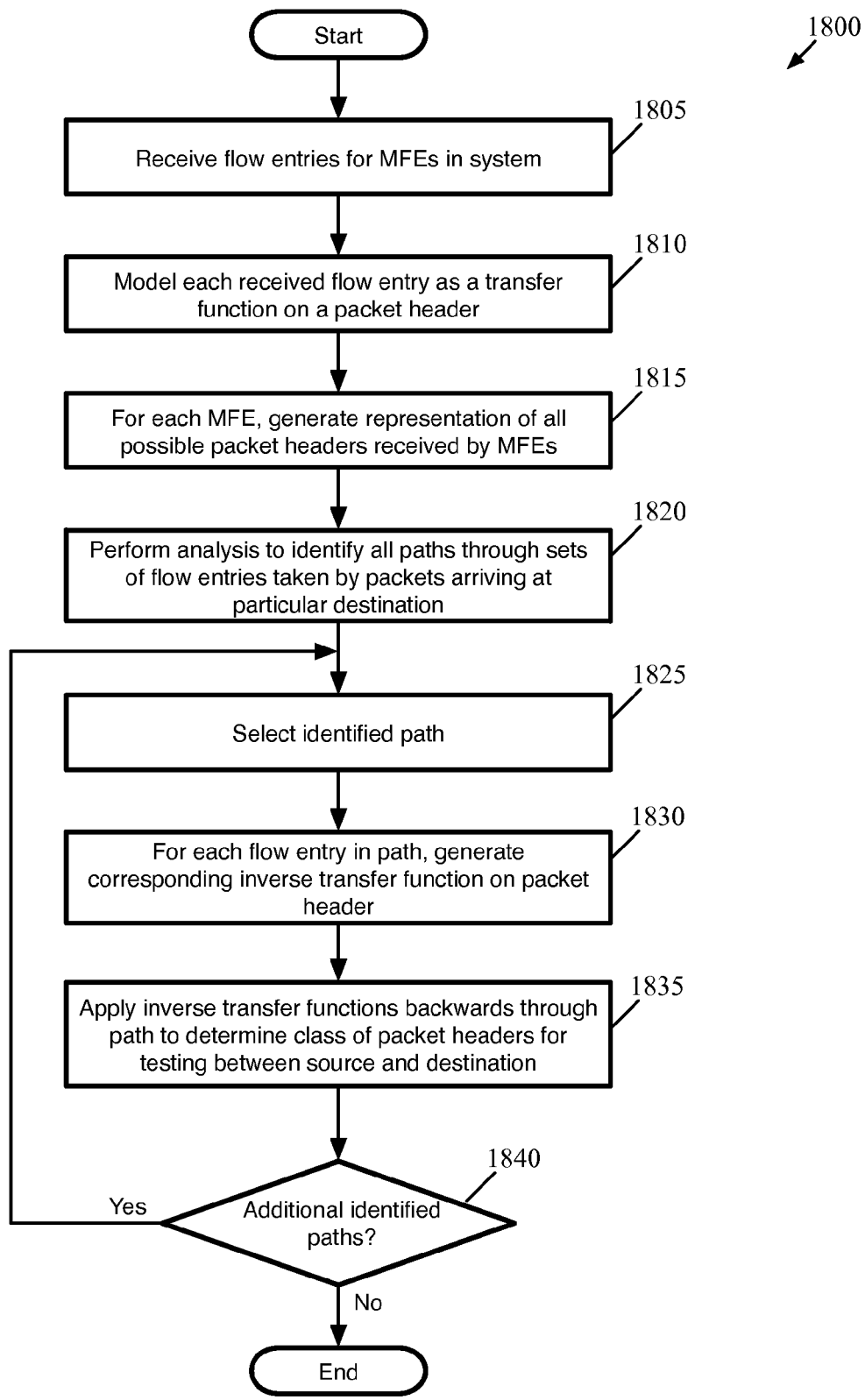
FIG. 18 conceptually illustrates a process of some embodiments for identifying packet header classes for paths between two network locations.

FIG. 18 conceptually illustrates a process 1800 of some embodiments for identifying packet header classes for paths between two network locations. In some embodiments, the analysis of process 1800 uses the flow reachability analysis in order to identify paths between two network locations. In some embodiments, a network controller performs the process 1800 after generating flow entries for a logical network. In other embodiments, however, the process 1800 is performed in a testing situation either outside the deployment of the network controller and the logical networks, or prior to this deployment. For example, a separate flow analysis application operating either on the network controller or in conjunction with the network controller might perform the process 1800 in order to identify packet inputs for a network testing application.

As shown, the process 1800 begins (at 1805) by receiving flow entries for the MFEs that implement a logical network. The flow entries are those that a network controller has generated (or would generate) for distribution to the MFEs implementing the logical network. In addition, in some embodiments, the flow entries also include entries that would be generated at the MFE according to learning actions (e.g., actions that simulate traditional L2 learning), as discussed in the previous section. When only interested in paths between two specific network locations, some embodiments identify only the flow entries for MFEs that could potentially process a packet in a path between the two network locations, rather than all MFEs implementing the logical network.

The process 1800 models (at 1810) each of the received flow entries as a transfer function operating on a packet header. As noted above, in some embodiments, rather than treating the packet headerspace as a set of L+M bits, the headerspace is modeled as a set of fields based on the packet header and additional metadata stored by the MFEs for a packet. A transfer function T operates on a set of fields $\{f_1, f_2, \ldots f_N\}$, mapping a first set of values in this space to a second set of values in the space.

In some embodiments, the transfer function for a particular flow entry only operates on certain portions of the headerspace (i.e., those portions that satisfy its match conditions). For example, the transfer function generated for the first flow entry 1 from FIG. 8 above only operates on the portions of headerspace in which the reg1 field could equal "1" and the source MAC address could field equal "A". Thus, packets with the reg1 field or the source MAC field wildcarded could match on this flow entry, but not packets in which either of these fields is set to a definite value other than that specified. In addition, the output of this transfer function will map this portion of the headerspace to a definite resolved value for both the match conditions (i.e., the output packet header has a definite source MAC of "A") and the actions taken (i.e., the output packet header has a definite reg2 value of "1, with values specified by the actions superseding the values resolved by the match conditions (e.g., the reg1 field will be mapped to the value "2" based on the specified action). All fields that are not affected by the flow entry are mapped to their input value, whether this is a wildcarded value or a specific value.

The process 1800 also generates (at 1815) a representation for all possible packet headers received by the MFEs from a particular source. As with the flow entries, in some embodiments this is limited to the possible packet headers received at a specific network location (i.e., from a particular source VM that connects to a particular MFE). In some embodiments, the analysis application does not begin with a fully wildcarded packet header and set of registers, because this would match all flow entries, and would fail to account for the stage-by-stage nature of the MFE processing of some embodiments. Thus, some embodiments set the context register of the packets to indicate that they are newly received packets, as well as generate representations for the various input ports at which a packet can be received. Instead, various packet headers will be input into the analysis application for the reachability analysis (e.g., packets from each possible input port, with the context register set but the packet otherwise fully wildcarded). As described above, some embodiments create each of the packet header representations as an object, then use the transfer functions to manipulate the values of these objects.

With the inputs (packet headers) and operations (transfer functions) determined, the process performs (at 1820) analysis on the packet header representations to identify all paths through different sets of the flow entries taken by packets arriving at a particular destination (from the particular source). As described in detail above by reference to FIG. 11, some embodiments use a recursive process that processes each packet header in a depth-first manner. That is, the analysis application follows a path through a sequence of flow entries for a packet header, marking the flow entries that a packet could match. When the packet processing is complete (i.e., the packet has matched a flow entry specifying to drop the packet or deliver the packet to its destination), the analysis application returns the packet to a previous stage in which it could have matched multiple flow entries (based on wildcarded fields), then chooses a different flow entry to complete the path. In this manner, the analysis application identifies all of the flow entries that a packet header could match. When only identifying paths between two specific network locations, however, some embodiments discard paths that end at different network locations.

Because the two network locations may be located at different MFEs, in some embodiments the paths identified include tunnel send flow entries at a first MFE and tunnel receive flow entries at a second MFE. As such, some embodiments perform the analysis in the manner described above by reference to FIG. 13, or a similar process that enables paths to be identified across multiple MFEs.

With the paths between two network locations identified, the process selects (at 1825) one of the identified paths. In some embodiments, the application determines input packet headers for all of the paths between two network locations, so that each of the paths can be tested in the actual implementation of the network. The order in which the application selects the paths can be based on the order in which the paths were identified by the recursive flow reachability analysis, randomized, etc. Each selected path, in some embodiments, includes one or more flow entries arranged in a specific order. In many cases, a packet sent from one VM to another VM in an implementation of a logical network will be processed by twenty or more flow entries (primarily at the first hop MFE).

With a path selected, the process 1800 generates (at 1830) a corresponding inverse transfer function on a packet header. As with the transfer functions, rather than treating the packet headerspace as a set of bits, some embodiments model the headerspace as a set of fields based on the packet header and additional data stored by the MFEs for the packet. Thus, an inverse transfer function operates on a set of fields $\{f_1, f_2, \ldots f_N\}$, mapping a first set of values in this space to a second set of values in the space (noting that each of these fields is, effectively, a set of bits).

In some embodiments, the inverse transfer function for a particular flow entry only operates on certain portions of the headerspace (i.e., those portions that satisfy its match conditions or are modified by its actions). Specifically, an inverse transfer function for a flow entry that matches on a particular field will map the headerspace to the match value for that particular field. For example, a logical forwarding flow entry that matches on the destination MAC address will have an inverse transfer function that maps its input (the flow entry output) to a distinct value for the destination MAC address. In addition, fields that are set by the flow entry may be mapped to a wildcarded value for that field in some embodiments. Fields that are not affected by the flow entry are mapped to their input value, whether this is a wildcarded value or a specific value.

Having generated the necessary inverse transfer functions, the process applies (at 1835) the inverse transfer functions backwards through the path to determine a class of packet headers for testing between the source and destination. Representing the output packet header of the path as H, this effectively performs the operation $T_1^{-1}(T_2^{-1}(\ldots(T_N^{-1}(H))\ldots))$ on the packet header, in order to identify an input packet header. This input packet header will have numerous fields wildcarded, and thus represents a class of possible packet headers that can be tested by using any packet in the class, in some embodiments. For example, if sending a packet from a first VM to a second VM, the destination MAC address and physical input ports might be the only fields that are required to have a specific value (assuming that, e.g., there is no ACL to check the source MAC address).

The process 1800 then determines (at 1840) whether there are any additional paths identified between the particular source and destination locations in the network. If there are other such paths, the process returns to operation 1825 to select another path, generate inverse transfer functions for its flow entries (possibly reusing some of the inverse functions generated for previous paths with overlapping flow entries), and determine the input packet class for the path. Once all paths have been analyzed, the process 1800 ends.

Figure 19:
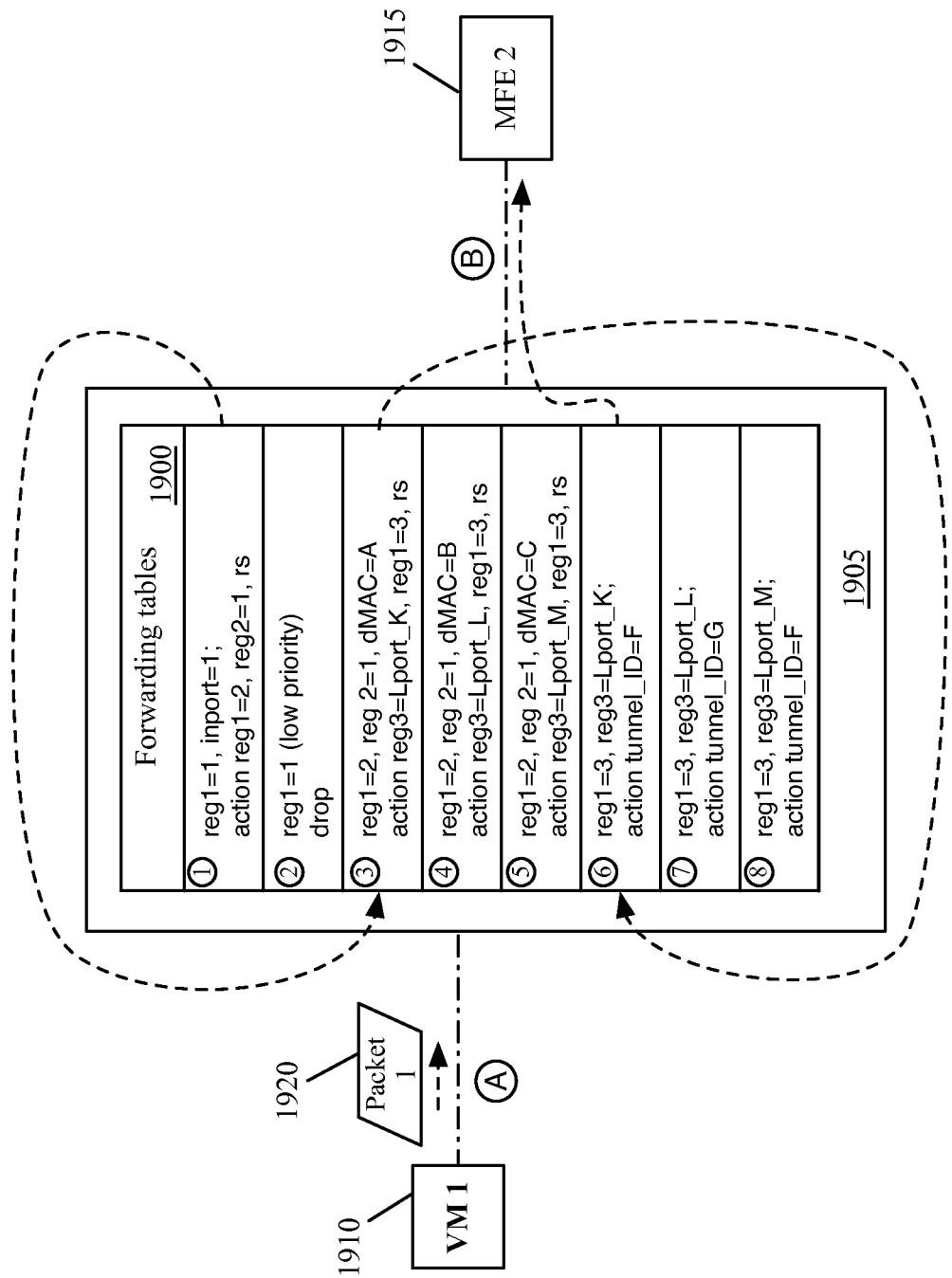
FIGS. 19 and 20 illustrate two different paths between two network locations.
Figure 20:
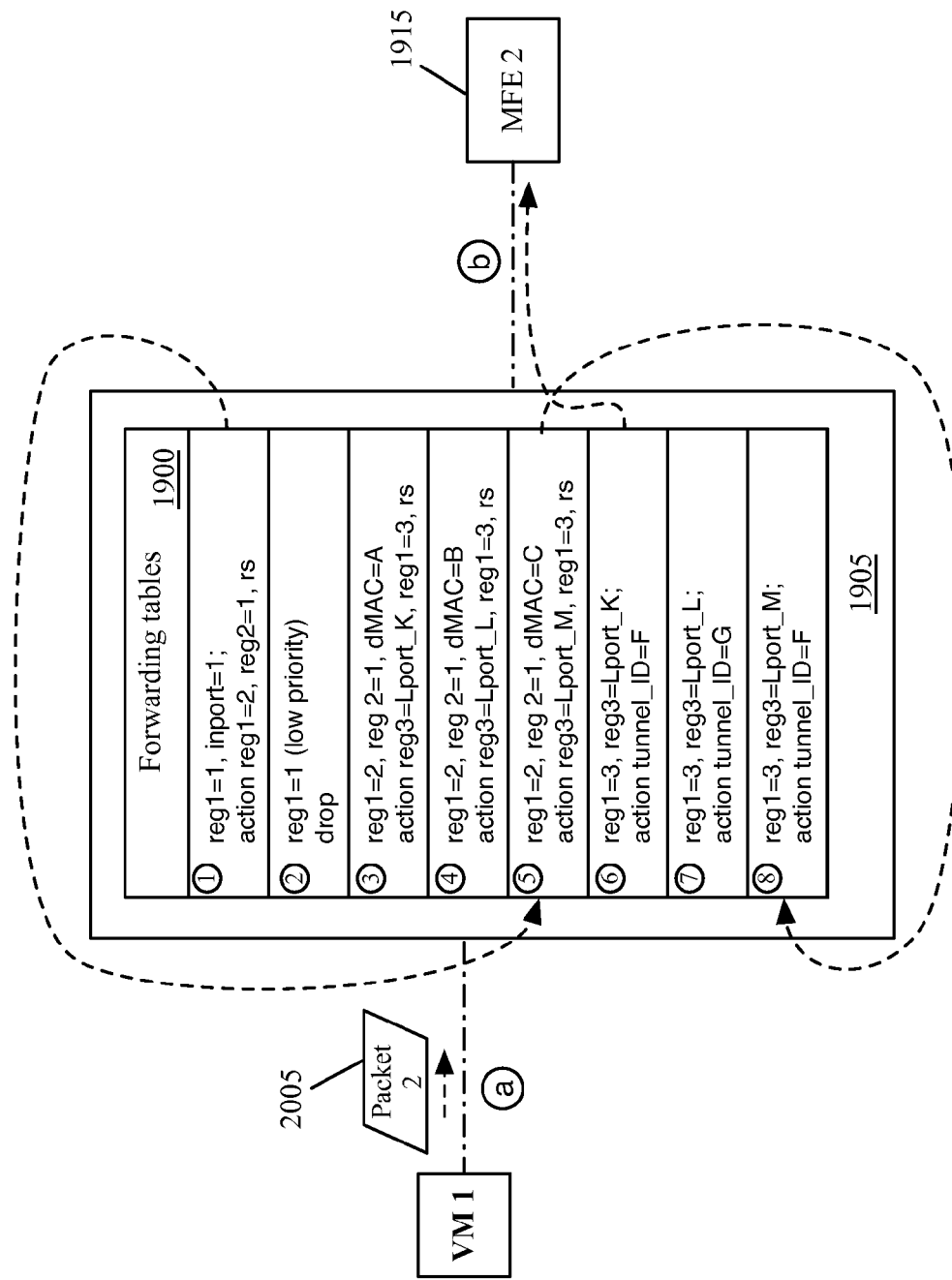

FIGS. 19 and 20 illustrate two different paths between network locations A and B. Specifically, these figures illustrate forwarding tables 1900 of a MFE 1905, and the paths that two different packets take through this MFE. In this case, the first network location A is the port of the MFE 1905 to which a VM 1910 connects, and the second network location B is the tunnel port to a different MFE 1915.

In FIG. 19, a first packet 1920 initially matches flow entry 1 (based on its input port), then matches flow entry 3 (based on its destination address). This flow entry 3 specifies a particular logical egress port for the packet, which causes the packet 1920 to subsequently match flow entry 6, specifying a tunnel ID of "F" for the packet which is the tunnel to the second MFE 1915.

In FIG. 20, a second packet 2005 also initially matches flow entry 1, again base on the input port. Because this packet has a different destination MAC address, the packet next matches flow entry 5. This flow entry 5 specifies a different logical egress port for the packet, which causes the packet 2005 to subsequently match flow entry 8. However, like flow entry 6, this flow entry also specifies a tunnel ID of "F" for the packet (e.g., because the VMs with the destination addresses "A" and "C" are both connected to the MFE 1915.

The process 1800 of some embodiments (or a similar process for analyzing paths and determining input packet headers) would identify both of these paths as paths between the particular source (the input port to which the VM 1910 connects) and the particular destination (the tunnel to the MFE 1915). After generating inverse transfer functions for the various flow entries along the paths, such a process then uses these inverse transfer functions to determine the packet header classes that result in these paths.

Figure 21:
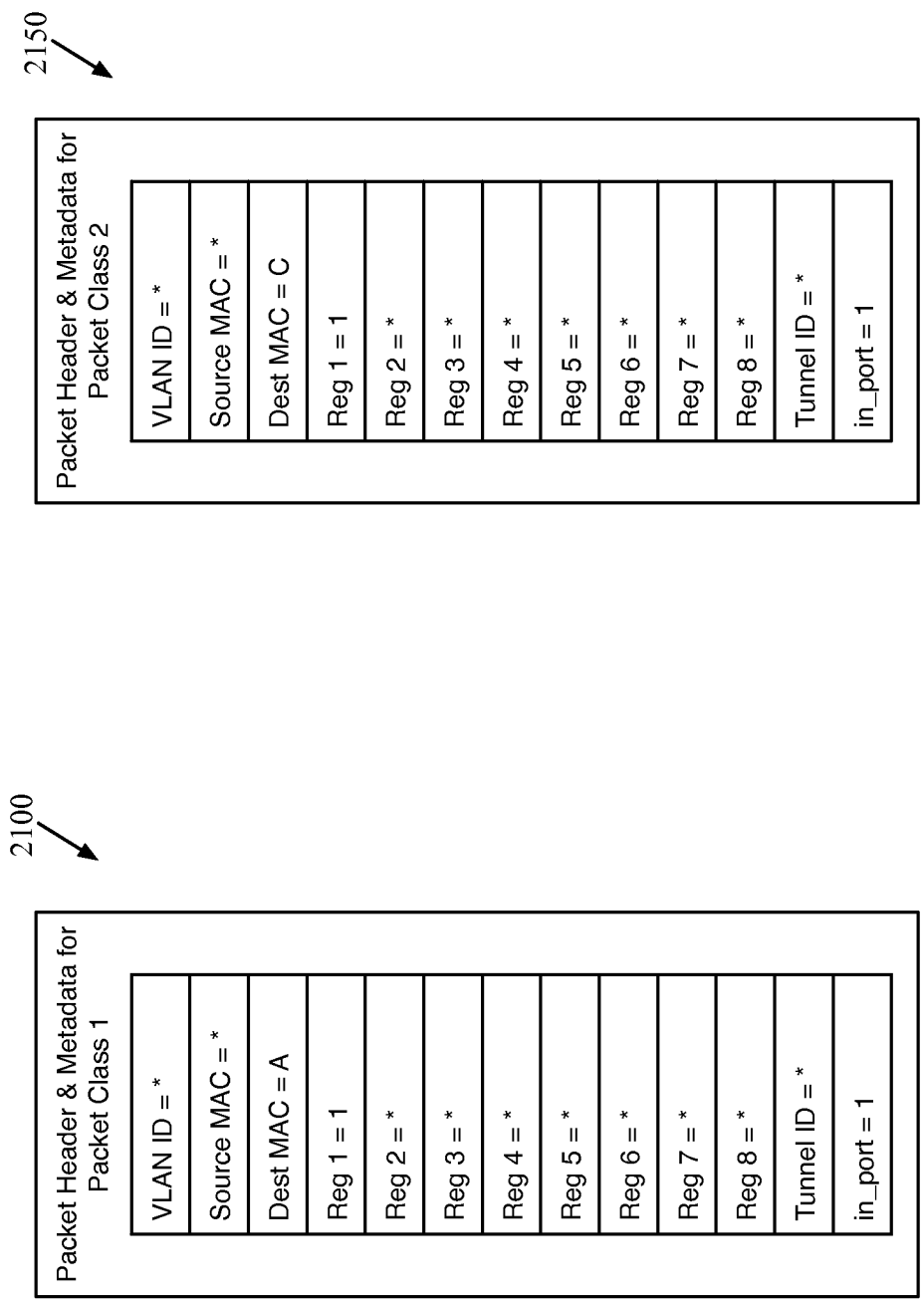
FIG. 21 illustrates data structures for packet headers.

FIG. 21 illustrates data structures 2100 and 2150 for these packet headers. In this case, the data structures 210 and 2150 have similar structures to the packet header structure 700 described above, with a VLAN ID, source and destination MAC addresses, eight registers, and a tunnel ID. In this case, the packet header structure also has an in_port field, which stores a physical input port. In some embodiments, this field is stored in one of the registers rather than having another separate field. Each of the two packet header structures has the VLAN ID, source MAC address, registers 2-7, and the tunnel ID field set as wildcards. In both cases, the input port is set to the value 1, but the destination MAC addresses are different between the packets. As such, if a testing application were to inject packets into the MFE 1905 having these values, with any value set for the wildcarded values, the packets would allow for the paths to be tested.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
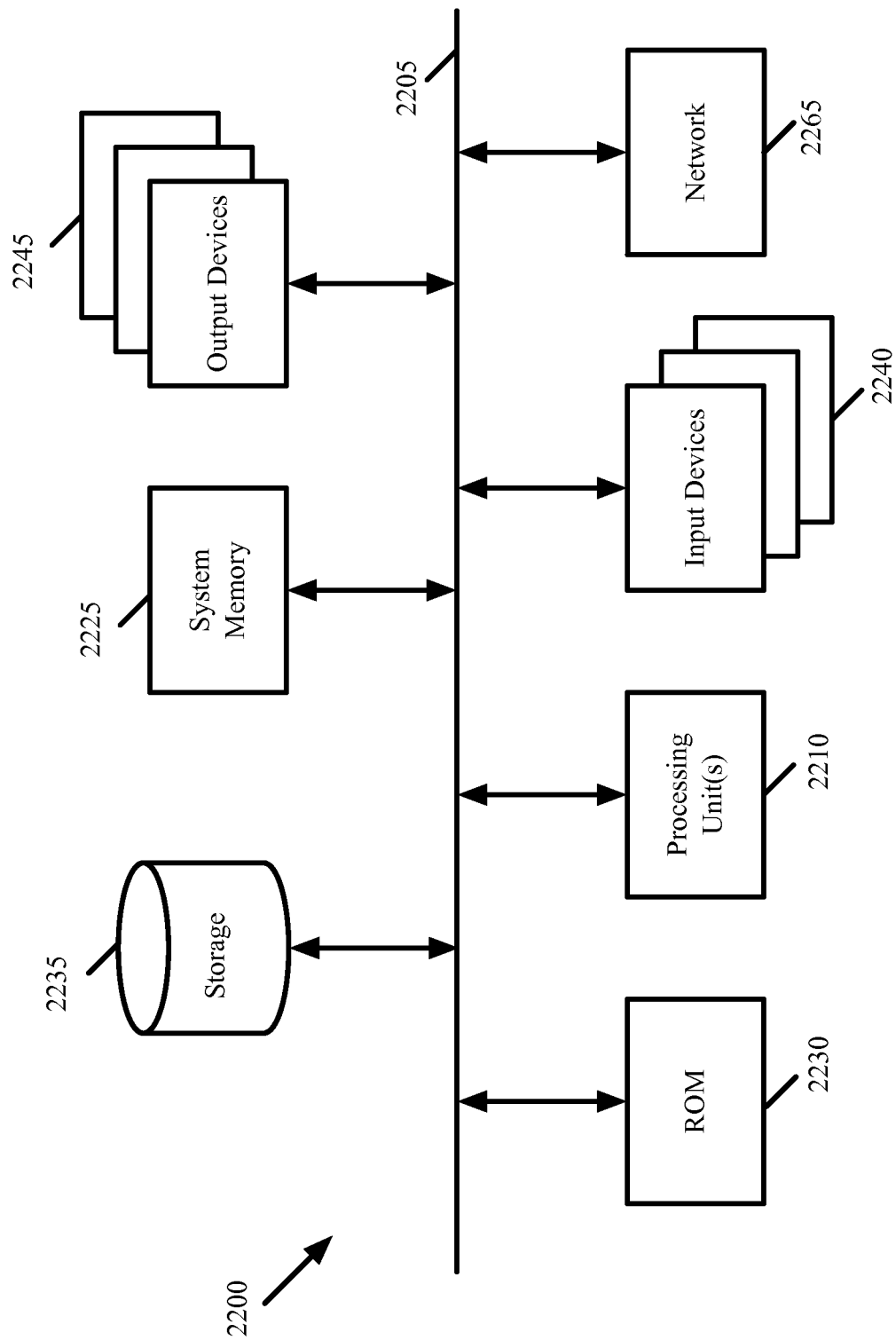
FIG. 22 conceptually illustrates an electronic system with which some embodiments of the invention are implemented.

FIG. 22 conceptually illustrates an electronic system 2200 with which some embodiments of the invention are implemented. The electronic system 2200 can be used to execute any of the control, virtualization, or operating system applications described above. The electronic system 2200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2200 includes a bus 2205, processing unit(s) 2210, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, etc.) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 11, 13, 16, and 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
   receiving a plurality of flow entries for distribution to a forwarding element in a network, wherein each flow entry comprises a set of conditions to be matched by a packet header and a set of actions to perform on a packet that matches the set of conditions, wherein the flow entries are arranged in stages;
   modeling each of the flow entries as a function that operates on a representation of a packet header;
   determining sets of packet headers representing all possible packets to be received by the forwarding element from a particular set of sources, each set of packet headers represented by a plurality of packet header field values with at least one packet header field wildcarded; and
   determining, of the plurality of flow entries, a set of flow entries that are not matched by a packet header of any of the possible packets to be received by the forwarding element, by processing the representations of the sets of packet headers through the stages of functions that model the flow entries and marking each of the flow entries the corresponding function of which is applied to at least one packet header representation.

2. The method of claim 1 further comprising removing the set of flow entries from the forwarding element.

3. The method of claim 1 further comprising only distributing to the forwarding element flow entries from the plurality of flow entries that are not in the determined set of flow entries.

4. The method of claim 3, wherein only the flow entries from the plurality of flow entries that are not in the determined set of flow entries are generated by a network controller for distribution to the forwarding element.

5. The method of claim 1, wherein the function for a particular flow entry comprises a mapping from a first set of packet header field values to a second set of packet header field values.

6. The method of claim 5, wherein the function for the particular flow entry is based on the set of conditions to be matched and the set of actions to perform of the particular flow entry.

7. The method of claim 1, wherein each set of packet headers comprises a first subset of fields representing sections of a packet header and a second subset of fields representing register values stored by the forwarding element.

8. The method of claim 1, wherein the sets of packet headers comprise packet headers of packets to be received from a machine connected locally to the forwarding element.

9. The method of claim 1, wherein the sets of packet headers comprise packet headers of packets to be received from another forwarding element through a tunnel.

10. The method of claim 1, wherein at least one of the plurality of flow entries comprises an action to create a new flow entry, wherein determining the set of flow entries that are not matched comprises:
 processing the representations of the sets of packet headers through the stages of functions a first time in order to (i) identify flow entries matched by the packet headers and (ii) generate new flow entries based on the flow entries that comprise an action to create a new flow entry;
 modeling each of the new flow entries as a function that operates on a representation of the packet header; and
 processing the representations of the sets of packet headers through the stages of functions a second time in order to identify any additional flow entries matched by the packet headers after incorporating the new flow entries.

11. The method of claim 1, wherein processing the representations of the sets of packet headers through the stages of functions comprises:
 selecting a first representation of a set of packet headers;
 for a first stage of flow entries, identifying a set of transfer functions for flow entries matched by the representation of the set of packet headers;
 selecting one of the identified set of transfer functions; and
 applying the selected transfer function to generate a modified packet header set representation.

12. The method of claim 11, wherein the set of transfer functions is a first set, wherein processing the representations of the sets of packet headers through the stages of functions further comprises:
 for a second stage of flow entries, identifying a second set of transfer functions for flow entries matched by the modified packet header set representation;
 selecting one of the identified second set of transfer functions; and
 applying the selected transfer function from the second set to generate a second modified packet header set representation.

13. A method comprising:
 receiving a plurality of flow entries for distribution to a forwarding element in a network, wherein each flow entry comprises a set of conditions to be matched by a packet header and a set of actions to perform on a packet that matches the set of conditions, wherein the flow entries are arranged in stages;
 modeling each of the flow entries as a function that operates on a representation of a packet header;
 determining a set of packet headers of packets to be received by the forwarding element;
 determining a set of the plurality of flow entries that are not matched by a packet header of any packet to be received by the forwarding element by applying the functions to representations of the determined set of packet headers,
 wherein applying the functions to representations of the determined set of packet headers comprises, for a particular representation of a particular packet header:
 for each particular stage:
  identifying a set of transfer functions for flow entries of the particular stage matched by a current packet header representation, wherein the current packet header representation is the particular packet header representation for the first stage;
  selecting one of the identified set of transfer functions for the flow entries of the particular stage and applying the selected transfer function to the current packet header representation to generate a modified packet header representation;
  when the selected transfer function does not include an action that serves as an endpoint for the current packet header representation, advancing to a next stage;
  when the selected transfer function includes an action that serves as an endpoint for the current packet header representation and the identified set of transfer functions for the current stage includes unselected transfer functions, selecting and applying another of the selected transfer functions to the modified packet header representation to generate a new modified packet header representation; and
  when the selected transfer function includes an action that serves as an endpoint for the current packet header representation and all of the transfer functions of the identified set of transfer functions for the current stage have been selected, returning to a previous stage with additional unselected transfer functions to apply the unselected transfer functions to a current packet header representation from the previous stage.

14. The method of claim 13, wherein the action that serves as an endpoint comprises an action to drop a packet.

15. The method of claim 13, wherein the action that serves as an endpoint comprises an action to deliver a packet to a destination of the packet.

16. A non-transitory machine readable medium storing a program for execution by at least one processing unit, the program comprising sets of instructions for:
 receiving a plurality of flow entries for distribution to a forwarding element in a network, wherein each flow entry comprises a set of conditions to be matched by a packet header and a set of actions to perform on a packet that matches the set of conditions, wherein the flow entries are arranged in stages;
 modeling each of the flow entries as a function that operates on a representation of a packet header;
 determining sets of packet headers representing all possible packets to be received by the forwarding element from a particular set of sources, each set of packet headers represented by a plurality of packet header field values with at least one packet header field wildcarded; and
 determining, of the plurality of flow entries, a set of flow entries that are not matched by a packet header of any of the possible packets to be received by the forwarding element, by processing the representations of the sets of packet headers through the stages of functions that model the flow entries and marking each of the flow entries the corresponding function of which is applied to at least one packet header representation.

17. The non-transitory machine readable medium of claim 16, wherein the function for a particular flow entry comprises a mapping from a first set of packet header field values for the fields to a second set of packet header field values.

18. The non-transitory machine readable medium of claim 17, wherein the function for the particular flow entry is based on the set of conditions to be matched and the set of actions to perform of the particular flow entry.

19. The non-transitory machine readable medium of claim 16, wherein each set of packet headers comprises a first subset of fields representing sections of a packet header and a second subset of fields representing register values stored by the forwarding element.

20. The non-transitory machine readable medium of claim 16, wherein the sets of packet headers comprise (i) packet headers of packets to be received from a machine connected locally to the forwarding element and (ii) packet headers of packets to be received from another forwarding element through a tunnel.

21. The non-transitory machine readable medium of claim 16, wherein at least one of the plurality of flow entries comprises an action to create a new flow entry, wherein the set of instructions for determining the set of flow entries that are not matched comprises sets of instructions for:
   processing the representations of the sets of packet headers through the stages of functions a first time in order to (i) identify flow entries matched by the packet headers and (ii) generate new flow entries based on the flow entries that comprise an action to create a new flow entry;
   modeling each of the new flow entries as a function that operates on a representation of the packet header; and
   processing the representations of the sets of packet headers through the stages of functions a second time in order to identify any additional flow entries matched by the packet headers after incorporating the new flow entries.

22. The non-transitory machine readable medium of claim 16, wherein the set of instructions for processing the representations of the sets of packet headers through the stages of functions comprises sets of instructions for:
   selecting a first representation of a set of packet headers;
   for a first stage of flow entries, identifying a set of transfer functions for flow entries matched by the representation of the set of packet headers;
   selecting one of the identified set of transfer functions; and
   applying the selected transfer function to generate a modified packet header set representation.

23. The non-transitory machine readable medium of claim 22, wherein the set of transfer functions is a first set, wherein the set of instructions for processing the representations of the sets of packet headers through the stages of functions further comprises sets of instructions for:
   for a second stage of flow entries, identifying a second set of transfer functions for flow entries matched by the modified packet header set representation;
   selecting one of the identified second set of transfer functions; and
   applying the selected transfer function from the second set to generate a second modified packet header set representation.

* * * * *